(12) United States Patent
Krzanowski et al.

(10) Patent No.: US 9,009,309 B2
(45) Date of Patent: Apr. 14, 2015

(54) TOKEN-BASED CREDITING OF NETWORK USAGE

(75) Inventors: Roman M. Krzanowski, White Plains, NY (US); Charles T. Wilkes, Londonderry, NH (US); Gregory D. Best, Fairfax, VA (US); Ralph Silvestri, Montville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1562 days.

(21) Appl. No.: 11/776,334

(22) Filed: Jul. 11, 2007

(65) Prior Publication Data

US 2009/0019155 A1   Jan. 15, 2009

(51) Int. Cl.
| | | |
|---|---|---|
| G06F 15/173 | (2006.01) | |
| G06F 3/048 | (2013.01) | |
| H04J 14/00 | (2006.01) | |
| H04L 29/06 | (2006.01) | |
| H04L 12/14 | (2006.01) | |
| H04L 29/12 | (2006.01) | |
| H04L 29/08 | (2006.01) | |

(52) U.S. Cl.
CPC ............ *H04L 63/0807* (2013.01); *H04L 61/00* (2013.01); *H04L 67/00* (2013.01); *H04L 12/14* (2013.01); *H04L 63/101* (2013.01); *H04L 63/102* (2013.01)

(58) Field of Classification Search
CPC ......... H04L 61/00; H04L 63/00; H04L 63/20; H04L 67/00; G06Q 10/06; G06Q 20/40975; G07F 7/02; G07F 7/1008
USPC ............ 705/1; 707/740; 709/219, 218, 225; 713/200
See application file for complete search history.

(56) References Cited

U.S. PATENT DOCUMENTS

| | | | | |
|---|---|---|---|---|
| 5,392,280 | A * | 2/1995 | Zheng ........................... | 370/353 |
| 5,481,542 | A * | 1/1996 | Logston et al. ................ | 725/131 |
| 5,559,798 | A * | 9/1996 | Clarkson et al. .............. | 370/468 |
| 5,752,041 | A | 5/1998 | Fosdick | |
| 5,835,711 | A * | 11/1998 | Chang et al. ................... | 709/232 |
| 6,075,789 | A * | 6/2000 | Kasslin et al. ................. | 370/338 |
| 6,081,518 | A * | 6/2000 | Bowman-Amuah .......... | 370/352 |
| 6,147,975 | A * | 11/2000 | Bowman-Amuah .......... | 370/252 |
| 6,396,531 | B1 * | 5/2002 | Gerszberg et al. .......... | 348/14.01 |
| 6,418,558 | B1 * | 7/2002 | Roberts et al. ................ | 725/129 |
| 6,510,516 | B1 * | 1/2003 | Benson et al. ................ | 713/167 |
| 6,587,865 | B1 * | 7/2003 | Kimbrel et al. ............... | 718/104 |
| 6,606,744 | B1 * | 8/2003 | Mikurak ........................ | 717/174 |
| 6,704,576 | B1 * | 3/2004 | Brachman et al. ............ | 455/503 |
| 6,823,385 | B2 * | 11/2004 | McKinnon et al. ........... | 709/226 |
| 6,834,341 | B1 * | 12/2004 | Bahl et al. ..................... | 713/156 |
| 6,845,106 | B2 * | 1/2005 | McKinnon et al. ........... | 370/477 |
| 6,850,533 | B2 * | 2/2005 | Gerszberg et al. ............ | 370/401 |
| 6,883,095 | B2 * | 4/2005 | Sandhu et al. ................. | 713/168 |
| 6,898,711 | B1 | 5/2005 | Bauman et al. | |
| 6,940,980 | B2 * | 9/2005 | Sandhu et al. ................ | 380/282 |
| 6,944,166 | B1 * | 9/2005 | Perinpanathan et al. ..... | 370/401 |
| 6,993,044 | B2 * | 1/2006 | McKinnon et al. ........... | 370/468 |
| 7,017,041 | B2 * | 3/2006 | Sandhu et al. ................ | 713/156 |

(Continued)

FOREIGN PATENT DOCUMENTS

GB    2397731    7/2004

*Primary Examiner* — Arvin Eskandarnia
*Assistant Examiner* — Margishi Desai

(57) ABSTRACT

A method may include providing content or a service accessible via a network to a user, and issuing a usage token having a usage credit that corresponds to a usage restriction associated with the user's network access subscription.

20 Claims, 18 Drawing Sheets

(56) References Cited

U.S. PATENT DOCUMENTS

| | | | |
|---|---|---|---|
| 7,031,708 B2* | 4/2006 | Sarkkinen et al. | 455/436 |
| 7,032,241 B1* | 4/2006 | Venkatachary et al. | 726/4 |
| 7,039,037 B2* | 5/2006 | Wang et al. | 370/349 |
| 7,139,247 B2* | 11/2006 | Desai et al. | 370/255 |
| 7,146,630 B2* | 12/2006 | Dravida et al. | 725/111 |
| 7,149,450 B2* | 12/2006 | Takemura | 399/75 |
| 7,174,568 B2* | 2/2007 | Chatani et al. | 726/27 |
| 7,287,275 B2* | 10/2007 | Moskowitz | 726/13 |
| 7,305,697 B2* | 12/2007 | Alao et al. | 725/114 |
| 7,418,433 B2* | 8/2008 | Sako et al. | 706/47 |
| 7,450,531 B2* | 11/2008 | Iyer et al. | 370/310 |
| 7,451,217 B2* | 11/2008 | Wardrop | 709/225 |
| 7,466,652 B2* | 12/2008 | Lau et al. | 370/230.1 |
| 7,552,093 B2* | 6/2009 | Levin et al. | 705/59 |
| 7,552,192 B2* | 6/2009 | Carmichael | 709/217 |
| 7,577,660 B2* | 8/2009 | Ohtani | 1/1 |
| 7,656,797 B2* | 2/2010 | Khasnabish et al. | 370/230 |
| 7,685,597 B1* | 3/2010 | Czajkowski et al. | 718/100 |
| 7,716,240 B2* | 5/2010 | Lim | 707/781 |
| 7,814,076 B2* | 10/2010 | Sack et al. | 707/694 |
| 2002/0046255 A1* | 4/2002 | Moore et al. | 709/218 |
| 2002/0075844 A1* | 6/2002 | Hagen | 370/351 |
| 2002/0078344 A1* | 6/2002 | Sandhu et al. | 713/155 |
| 2002/0091645 A1* | 7/2002 | Tohyama | 705/59 |
| 2002/0116488 A1* | 8/2002 | Subramanian et al. | 709/224 |
| 2002/0118699 A1* | 8/2002 | McKinnon et al. | 370/447 |
| 2002/0129123 A1* | 9/2002 | Johnson et al. | 709/219 |
| 2002/0186844 A1* | 12/2002 | Levy et al. | 380/231 |
| 2003/0028622 A1* | 2/2003 | Inoue et al. | 709/219 |
| 2003/0074312 A1* | 4/2003 | White | 705/40 |
| 2003/0172145 A1* | 9/2003 | Nguyen | 709/223 |
| 2003/0211860 A1* | 11/2003 | Sarkkinen et al. | 455/522 |
| 2003/0212800 A1* | 11/2003 | Jones et al. | 709/228 |
| 2003/0217362 A1* | 11/2003 | Summers et al. | 725/63 |
| 2004/0010705 A1* | 1/2004 | Sako et al. | 713/200 |
| 2004/0088510 A1* | 5/2004 | Hori | 711/165 |
| 2004/0122958 A1* | 6/2004 | Wardrop | 709/229 |
| 2004/0151184 A1* | 8/2004 | Wang et al. | 370/395.2 |
| 2004/0199472 A1* | 10/2004 | Dobbins | 705/50 |
| 2004/0199667 A1* | 10/2004 | Dobbins | 709/240 |
| 2004/0258094 A1* | 12/2004 | Bashan et al. | 370/486 |
| 2004/0261094 A1* | 12/2004 | Huslak et al. | 725/25 |
| 2005/0044228 A1* | 2/2005 | Birkestrand et al. | 709/226 |
| 2005/0066200 A1* | 3/2005 | Bahl et al. | 713/201 |
| 2005/0108395 A1* | 5/2005 | Brey et al. | 709/225 |
| 2005/0154923 A1* | 7/2005 | Lok et al. | 713/202 |
| 2005/0243726 A1* | 11/2005 | Narendran | 370/238 |
| 2006/0059565 A1* | 3/2006 | Green et al. | 726/27 |
| 2006/0072144 A1* | 4/2006 | Dowling et al. | 358/1.15 |
| 2006/0072541 A1* | 4/2006 | Pecus | 370/351 |
| 2006/0088011 A1* | 4/2006 | Iyer et al. | 370/338 |
| 2006/0112016 A1* | 5/2006 | Ishibashi | 705/52 |
| 2006/0122900 A1* | 6/2006 | Bean et al. | 705/26 |
| 2006/0123455 A1* | 6/2006 | Pai et al. | 725/133 |
| 2006/0168614 A1* | 7/2006 | Salas et al. | 725/23 |
| 2006/0236384 A1* | 10/2006 | Lindholm et al. | 726/10 |
| 2007/0078777 A1* | 4/2007 | Demartini et al. | 705/59 |
| 2007/0118414 A1* | 5/2007 | Asaki et al. | 705/7 |
| 2007/0203714 A1* | 8/2007 | McEnroe et al. | 705/1 |
| 2007/0226785 A1* | 9/2007 | Chow et al. | 726/8 |
| 2007/0258361 A1* | 11/2007 | McEwen | 370/229 |
| 2008/0005156 A1* | 1/2008 | Edwards et al. | 707/102 |
| 2008/0010124 A1* | 1/2008 | Paek et al. | 705/14 |
| 2008/0013470 A1* | 1/2008 | Kopplin | 370/310 |
| 2008/0049630 A1* | 2/2008 | Kozisek et al. | 370/250 |
| 2008/0060084 A1* | 3/2008 | Gappa et al. | 726/28 |
| 2008/0077794 A1* | 3/2008 | Arnold et al. | 713/169 |
| 2008/0092239 A1* | 4/2008 | Sitrick et al. | 726/27 |
| 2008/0172730 A1* | 7/2008 | Sandhu et al. | 726/9 |
| 2008/0177663 A1* | 7/2008 | Gupta et al. | 705/44 |
| 2008/0208715 A1* | 8/2008 | Hod et al. | 705/27 |
| 2008/0209491 A1* | 8/2008 | Hasek | 725/114 |
| 2008/0235746 A1* | 9/2008 | Peters et al. | 725/111 |
| 2008/0279183 A1* | 11/2008 | Wiley et al. | 370/389 |
| 2008/0287098 A1* | 11/2008 | Kim | 455/407 |
| 2008/0289023 A1* | 11/2008 | Wardrop | 726/9 |
| 2009/0070454 A1* | 3/2009 | McKinnon et al. | 709/224 |
| 2010/0017867 A1* | 1/2010 | Fascenda | 726/9 |
| 2010/0031021 A1* | 2/2010 | Arnold et al. | 713/155 |
| 2010/0228613 A1* | 9/2010 | Anderson et al. | 705/14.13 |
| 2010/0250546 A1* | 9/2010 | Shuster | 707/740 |

\* cited by examiner

TOKEN-BASED CREDITING OF NETWORK USAGE

BACKGROUND INFORMATION

Network usage has risen dramatically within recent years. Consequently, network resources associated with a Network Service Provider (NSP) are correspondingly becoming overburdened. While subscriptions for network usage may allow for unlimited access, this service model may be transitioning towards usage restrictions. Difficulties may arise when enforcing these usage restrictions because NSPs may wish to exclude certain traffic from these usage restrictions. For example, a NSP or a trusted third party of a NSP may offer a service that the NSP does not want the usage restrictions to apply. In such a service model, enforcing usage restrictions while allowing for exemptions may be problematic.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Figure 1:
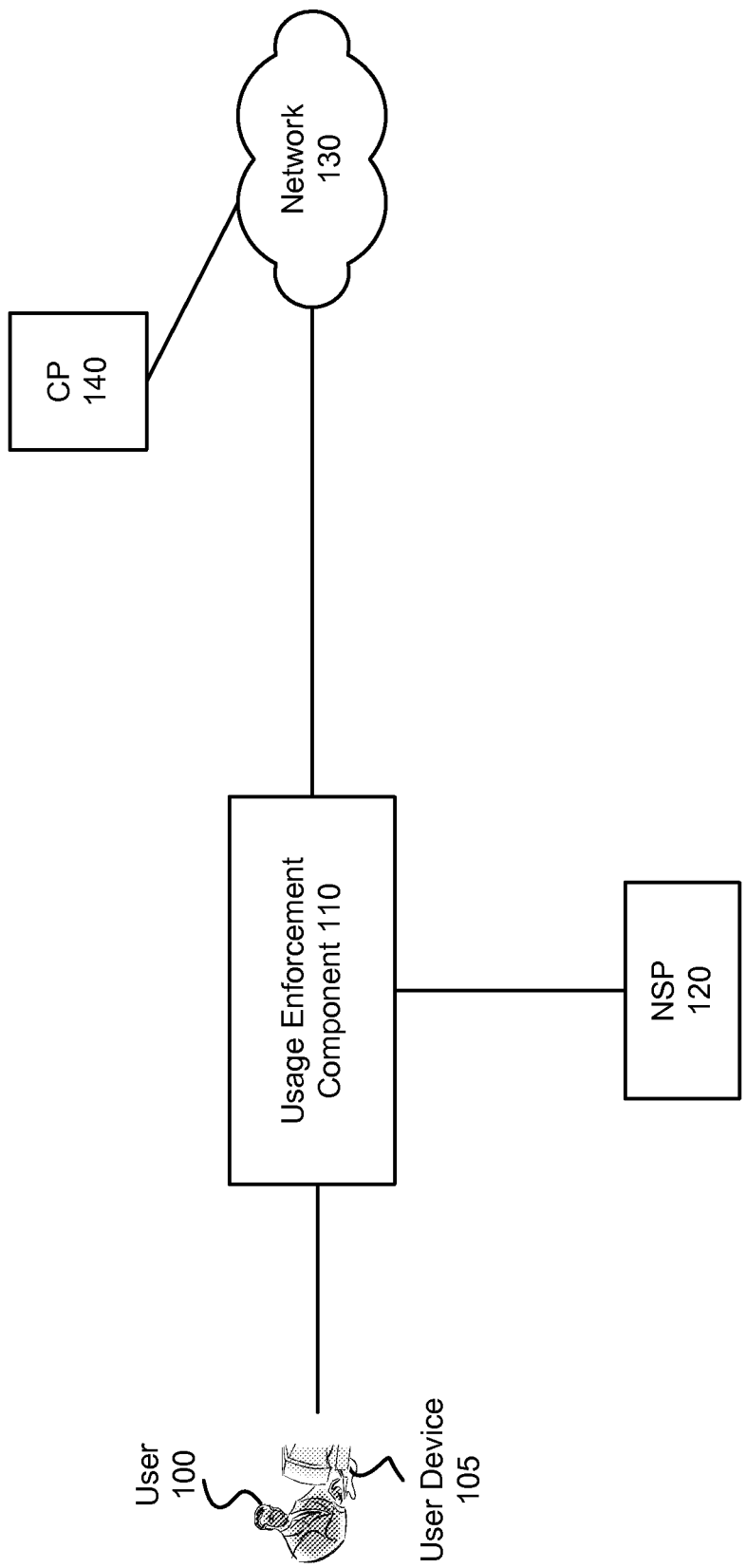
FIG. 1 is a diagram in which exemplary systems and methods described herein may be implemented.

Implementations described herein may provide token-based crediting of network usage. FIG. 1 is an exemplary diagram in which systems and methods described herein may be implemented. FIG. 1 illustrates a user 100, a user device 105, a usage enforcement component 110, a NSP 120, a network 130, and a Content Provider (CP) 140. This arrangement may include additional, fewer, or different components than are illustrated in FIG. 1. Also, two or more of these components may be implemented within a single component. For example, usage enforcement component 110 and NSP 120 may be implemented as a single component. Conversely, a single component may be implemented as multiple, distributed components. For example, usage enforcement component 110 may be a distributed component. Further, while FIG. 1 illustrates direct connections between the various components, any of these connections may be indirectly made via a node, a network, or a combination thereof.

User 100 may be a subscriber of NSP 120 for network access. User 100 may access NSP 120 via usage enforcement component 110, and any other node or network via usage enforcement component 110, such as network 130 and CP 140. The subscription of user 100 for network access may include a usage restriction. Usage restriction will be discussed in greater detail below.

User device 105 may include a client entity. An entity may be defined as a device, such as a computer, a laptop, a personal digital assistant (PDA), or another type of computation or communication device, a process, a thread, or a fiber running or capable of running on one of these devices. In one embodiment, user device 105 may allow user 100 to communicate with usage enforcement component 110, and any node or network via usage enforcement component 110, such as NSP 120, network 130 and CP 140.

Usage enforcement component 110 may include an entry node (i.e., a network entry point (NEP)) to network 130. Usage enforcement component 110 may enforce a usage restriction associated with the network access of a user, such as user 100. A usage restriction, as used herein, may include any parameter associated with a connection and/or a utilization of a network resource. For example, a usage restriction may be a byte or bit limitation, or a time limitation. In one implementation, usage enforcement component 110 may be a server or a firewall-type device.

NSP 120 may include a node that provides network access to a subscriber, such as user 100, via usage enforcement component 110. NSP 120 may provide content and/or a service, in addition to network access. In one implementation, NSP 120 may include one or more servers with network node management capabilities that may be employed to control usage enforcement component 110.

Network 130 may include one or more series of points or nodes interconnected by communication paths or links. Network 130 may include any network characterized by the type of link (e.g., an optical network), by access (e.g., a private network), by spatial distance (e.g., a local-area network (LAN)), by protocol (e.g. a TCP/IP network), by connection (e.g., a switched network, such as a Public Switched Telephone Network (PSTN)), the Internet, etc. Network 130 may include a combination of networks. Network 130 may provide access to various services and/or content. Network 130 may be an intermediary network to other nodes and/or networks. User 100 may access CP 140 via network 130.

CP 140 may include a node capable of providing content and/or services. For example, CP 140 may provide video-on-demand (VOD) movies for download, access to periodicals, music, etc. In one implementation, CP 140 may be a trusted third party of NSP 120. In another implementation, CP 140 may not be a trusted third party of NSP 120.

Figure 2:
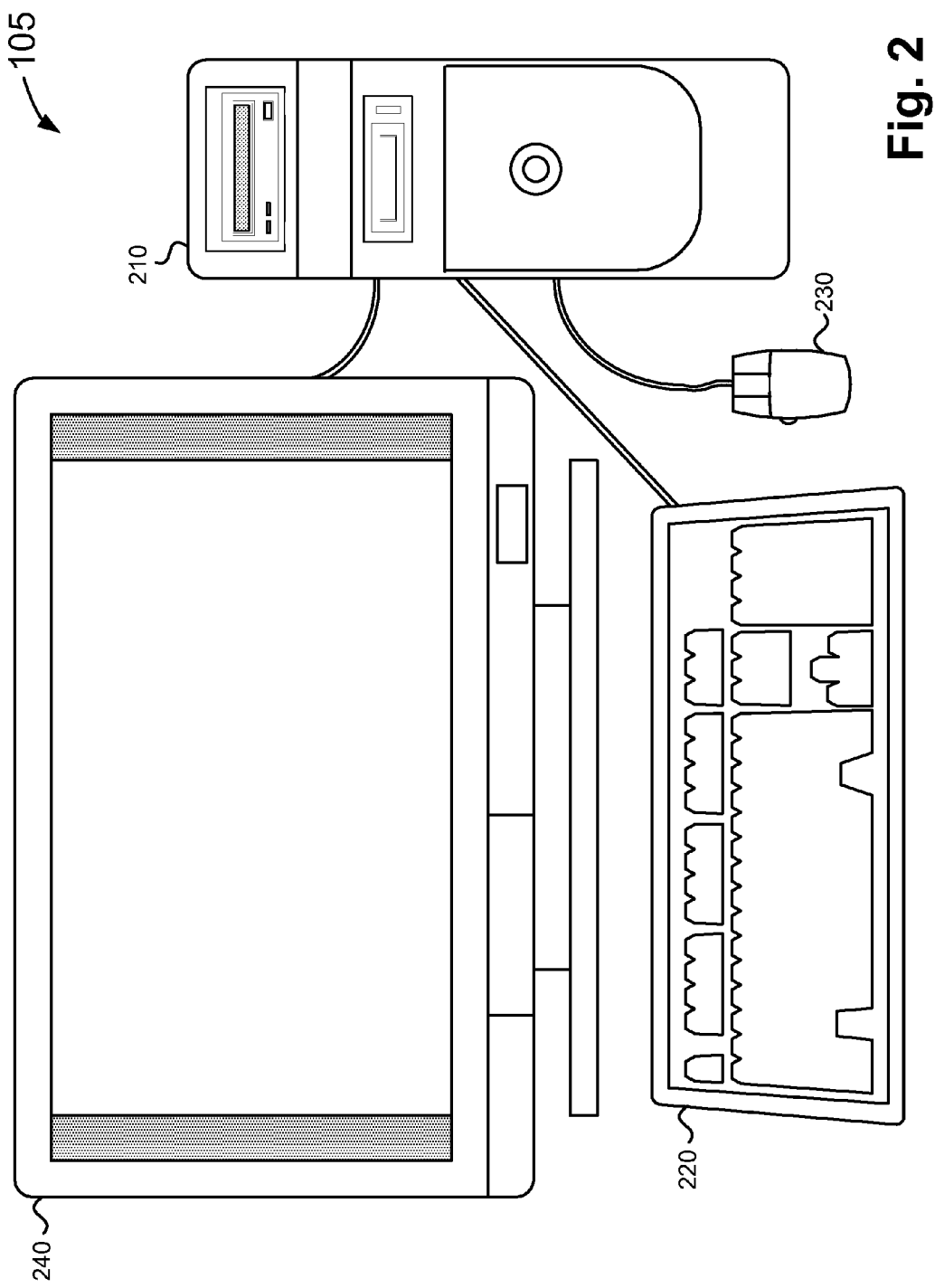
FIG. 2 is a diagram illustrating exemplary external components of user device 105.

FIG. 2 is a diagram illustrating exemplary external components of user device 105. As illustrated, user device 105 may include the following external components, such as a computer 210, a keyboard 220, a pointing device 230, and a monitor 240.

Computer 210 may include any type of computer system, such as a mainframe, minicomputer, personal computer, or the like. Keyboard 220 may include any conventional keyboard or keypad that allows a user, such as user 100 to input information into computer 210. Pointing device 230 may include one or more conventional pointing devices, such as a mouse, a pen, a trackball, a glide pad, biometric pointing devices, or the like.

Monitor 240 may include any conventional device capable of displaying images to a user, such as user 100. Monitor 240 may, for example, include a cathode ray tube display, a liquid crystal display, a gas panel display, or the like. In alternative implementations, pointing device 230 may be integrated within monitor 240 through the use of touch-screen technology.

Although FIG. 2 illustrates exemplary external components of user device 105, in other implementations, user device 105 may include fewer, additional and/or different components than the components depicted in FIG. 2. In still other implementations, one or more components of user device 105 may include the capabilities of one or more other components of user device 105.

Figure 3:
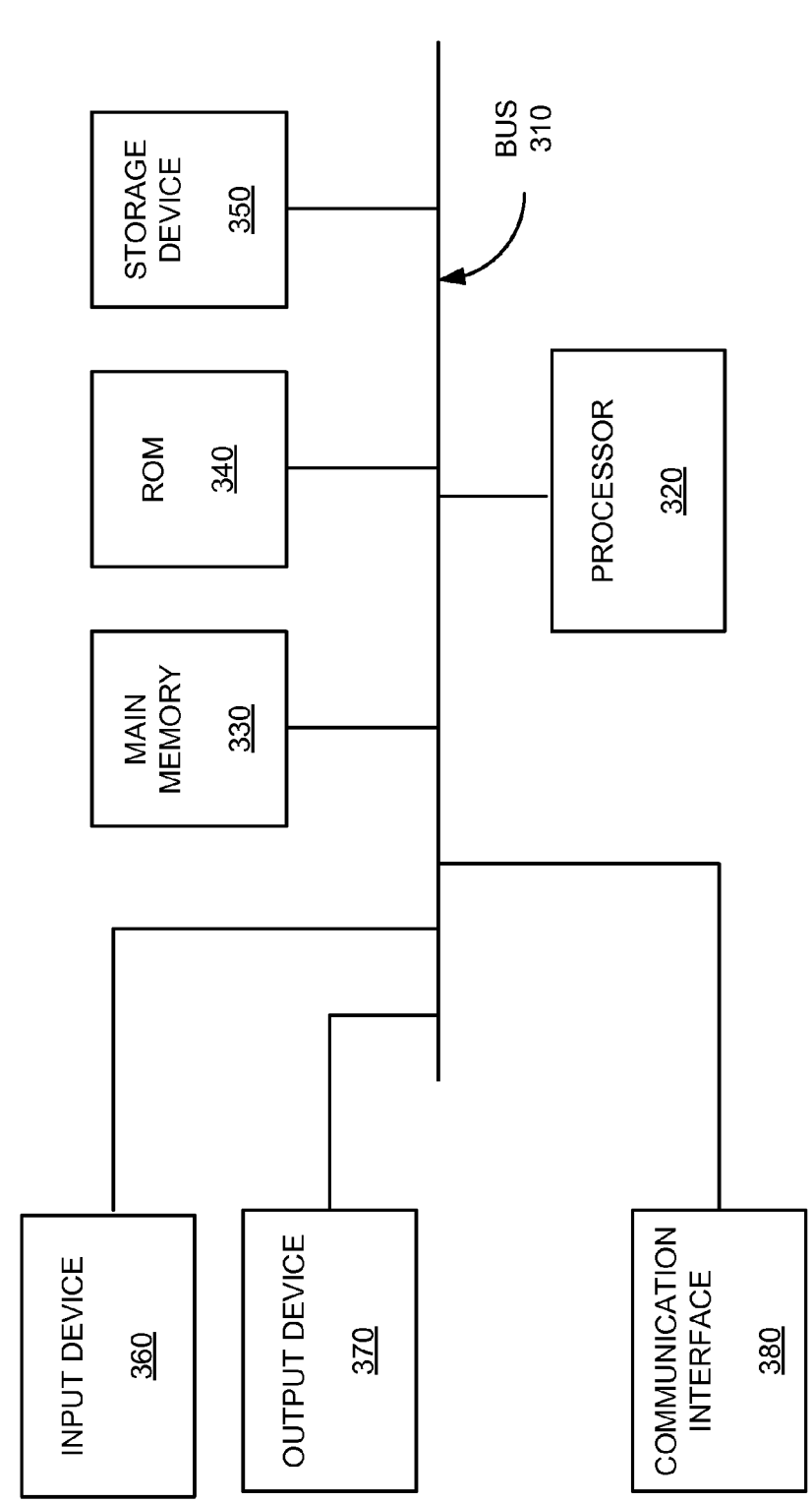
FIG. 3 is a diagram illustrating exemplary internal components of user device 105.

FIG. 3 is a diagram illustrating exemplary internal components of user device 105. As illustrated, the internal components may include a bus 310, a processor 320, a memory 330, a read only memory (ROM) 340, a storage device 350, an input device 360, an output device 370, and a communication interface 380. Bus 310 permits communication among the components of user device 105.

Processor 320 may include any type of conventional processor or microprocessor that interprets and executes instructions. In alternative implementations, processor 320 may be implemented as a field programmable gate array (FPGA), application specific integrated circuit (ASIC), or the like.

Memory 330 may include a random access memory (RAM) or another dynamic storage device that stores information and instructions for execution by processor 320. Memory 320 may also be used to store temporary variables or other intermediate information during execution of instructions by processor 320.

ROM 340 may include a conventional ROM device and/or another static storage device that stores static information and instructions for processor 320. Storage device 350 may include a magnetic disk or optical disk and its corresponding drive and/or some other type of magnetic or optical recording medium and its corresponding drive for storing information and instructions.

Input device 360 may include one or more conventional mechanisms that permit an operator to input information to user device 105, such as keyboard 220, pointing device 230 (e.g., a mouse, a pen, and the like), one or more biometric mechanisms, such as a voice recognition device, etc. Output device 270 may include one or more conventional mechanisms that output information to the user, such as user 100, such as a display (e.g., monitor 240), a printer, a speaker, etc. Communication interface 380 may include any transceiver-like mechanism that enables user device 105 to communicate with other devices and/or systems, such as usage component 110, NSP 120, network 130, and CP 140. For example, communication interface 380 may include a modem.

Although FIG. 3 illustrates exemplary internal components of user device 105, in other implementations, user device 105 may include fewer, additional, and/or different components than the components depicted in FIG. 3. In still other implementations, one or more internal components of user device 105 may include the capabilities of one or more other components of user device 105.

Figure 4:
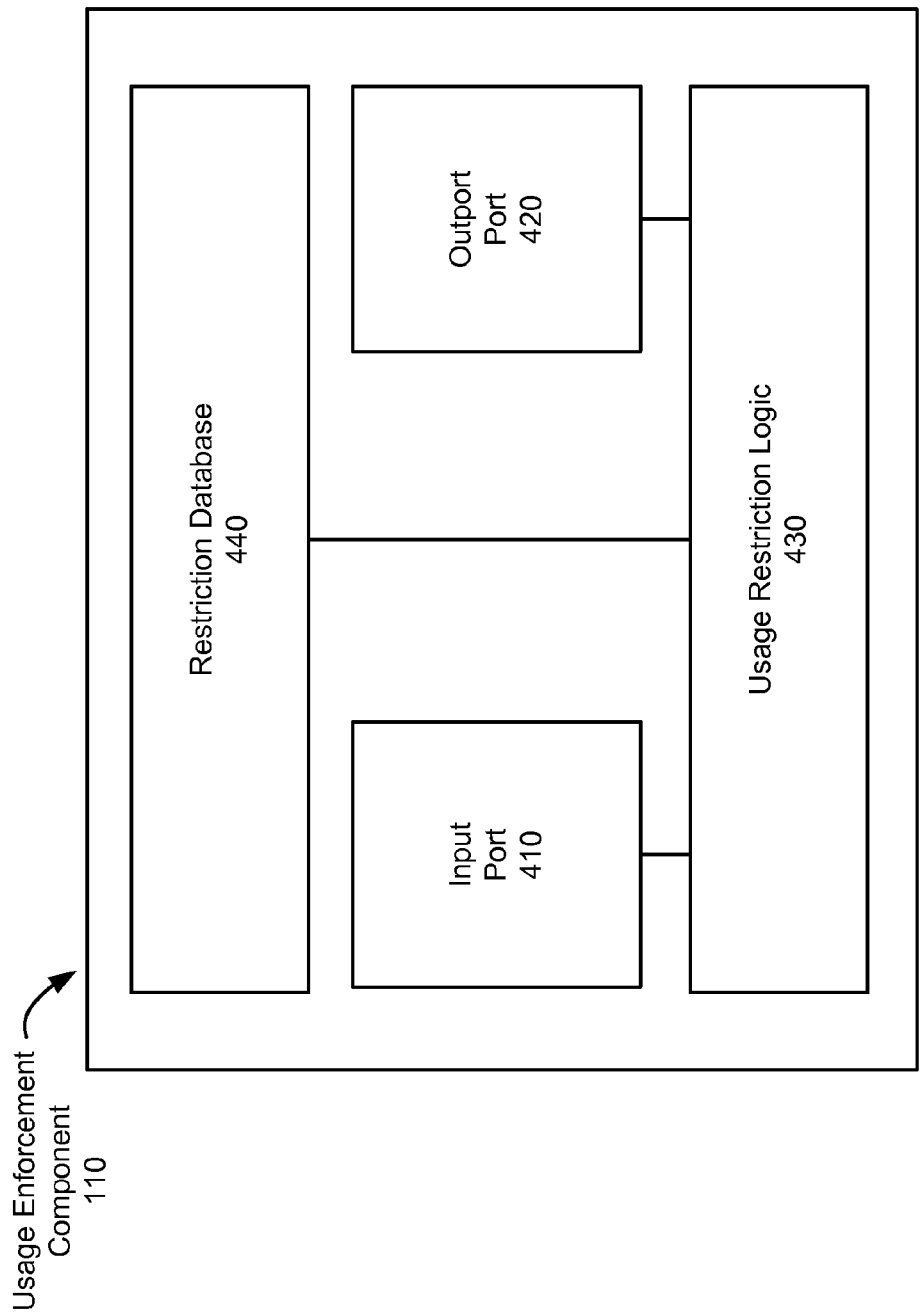
FIG. 4 is a diagram illustrating exemplary internal components of usage enforcement 110.

FIG. 4 is a diagram illustrating exemplary internal components of usage enforcement component 110. As illustrated, the internal components may include an input port 410, an output port 420, a usage restriction logic 430, and a restriction database 440.

Input port 410 may include a mechanism for receiving incoming data. Output port 420 may include a mechanism for transmitting outgoing data.

Usage restriction logic 430 may include any logic capable of regulating the network access of user 100 based on a usage restriction. Logic, as used herein, is intended to be interpreted broadly to include software, hardware, or a combination of hardware and software. In one implementation, usage restriction logic 430 may regulate network access by referring to restriction database 440. Usage restriction logic 430 may be capable of generating usage data associated with a connection and/or usage of a network resource.

Restriction database 440 may include data for enforcing a usage restriction. Restriction database 440 may be stored on a computer readable medium, such as a hard drive, and accessible to usage restriction logic 430 and/or NSP 120.

Although FIG. 4 illustrates exemplary internal components of usage enforcement component 110, in other implementations, user enforcement component 110 may include fewer, additional, and/or different components than the components depicted in FIG. 4.

Figure 5:
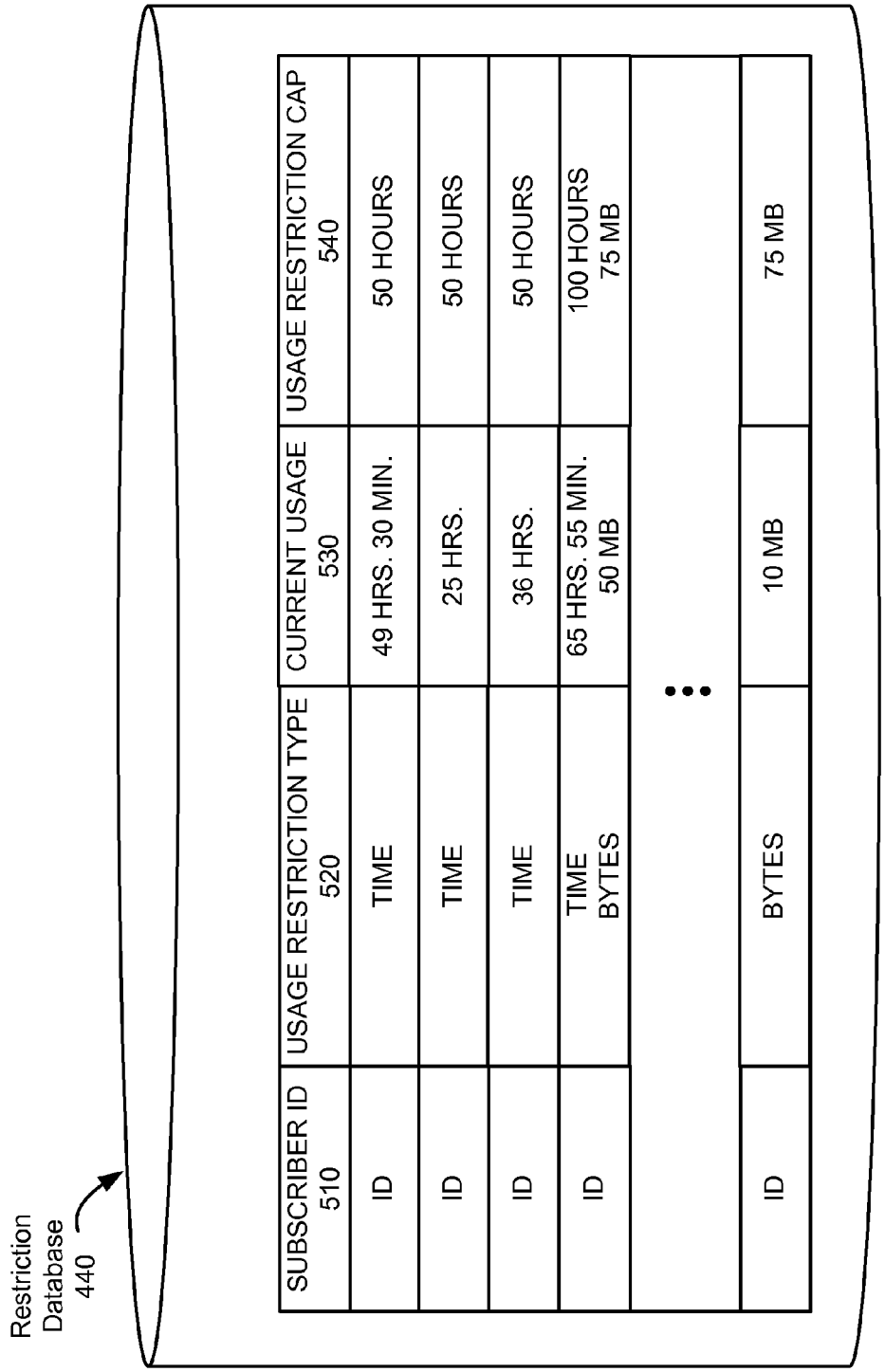
FIG. 5 is a diagram illustrating exemplary usage restriction data that may be stored in restriction database 440.

FIG. 5 is a diagram illustrating exemplary usage restriction data that may be stored in restriction database 440. The data contained in restriction database 440 may be arranged in a data structure, such as a table. As illustrated, the table may include the following exemplary fields, such as a subscriber ID field 510, a usage restriction type field 520, a current usage field 530, and a usage restriction cap field 540.

Subscriber ID field 510 may contain a string that identifies a subscriber, such as user 100. A string, as used herein, may include any sequence of symbols. For example, subscriber ID 510 may be a unique alphanumeric sequence, such as (DAS59999). Usage restriction type field 520 may contain a string that represents the type of restriction associated with a subscriber's network access. For example, a usage restriction may limit the amount of time or bandwidth a subscriber may utilize on a per connection basis, or for a period of time (e.g., daily, weekly, monthly, etc.). Thus, for example, as illustrated in FIG. 5, usage restriction type field 520 may contain a string, such as (TIME) or (BYTES). Current usage field 530 may contain a string that represents the amount of a usage restriction used or being used by a subscriber. Thus, for example, as illustrated in FIG. 5, current usage field 530 may contain a string indicating a total time of current usage (e.g., 49 HRS. 30 MIN.) or total amount of current usage (e.g., 50 Megabytes (MB)). Usage restriction cap field 540 may contain a string that indicates usage restriction limitations relating to network access, such as, for example, a total time restriction (e.g. 50 HOURS), or a total amount restriction (e.g., 75 MB).

Although FIG. 5 illustrates exemplary data of restriction database 440, in other implementations, restriction database 440 may include fewer, additional, and/or different data than the data depicted in FIG. 5.

Figure 6:
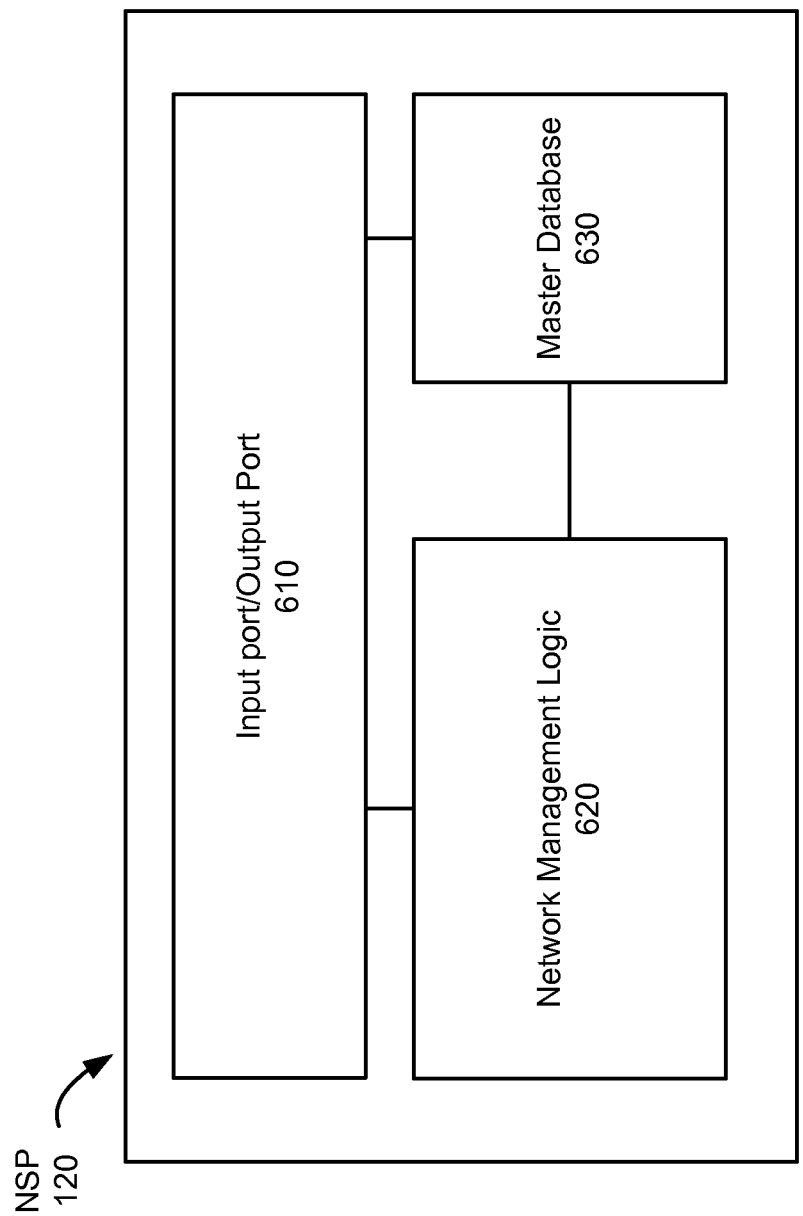
FIG. 6 is a diagram illustrating exemplary internal components of NSP 120.

FIG. 6 is a diagram illustrating exemplary internal components of NSP 120. As illustrated, the internal components may include an input port/output port 610, a network management logic 620, and a master database 630.

Input port/output port 610 may include a mechanism for receiving incoming data and transmitting outgoing data. Network management logic 620 may include any logic capable of monitoring and/or managing the operation of usage enforcement component 110 and the data contained in master database 630. Network management logic 620 may also include logic capable of generating a usage token, as will be described in reference to FIG. 10.

Master database 630 may include, among other things, subscriber information, usage restriction information, and content provider information. Master database 630 may also include content and/or service data that is accessible by a subscriber, such as user 100. Master database 630 will be described in greater detail in reference to FIG. 7.

Although FIG. 6 illustrates exemplary internal components of NSP 120, in other implementations, NSP 120 may include fewer, additional and/or different components than the components depicted in FIG. 6.

Figure 7:
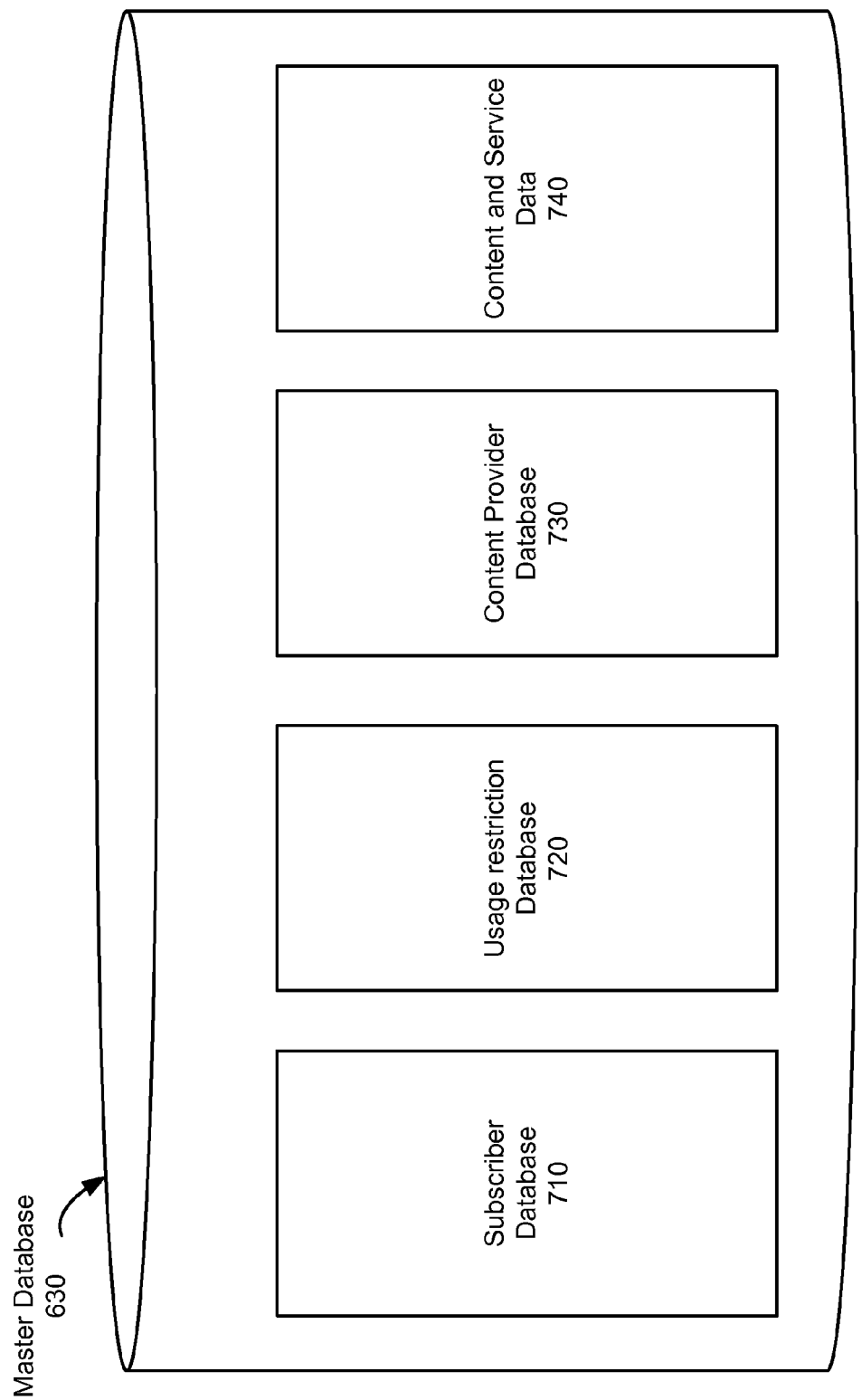
FIG. 7 is a diagram illustrating exemplary data that may be stored in master database 630.

FIG. 7 is a diagram illustrating exemplary data that may be contained in master database 630. The data may include a subscriber database 710, a usage restriction database 720, a content provider database 730, content and service data 740, and a usage token database 750.

Subscriber database 710 may include data associated with a subscriber of NSP 120, such as user 100. For example, subscriber database 710 may include personal information, such as name, address, and telephone number, billing information, credit card information, etc. Usage restriction database 720 may include data associated with enforcing a usage restriction associated with a subscriber of NSP 120. For example, usage restriction database 720 may include all the data stored in restriction database 440 of usage enforcement component 110. Usage restriction database 720 may also include additional usage restriction information (e.g., monitoring and tracking information generated by usage enforcement component 110). In addition, usage restriction database 720 may store usage tokens issued from CP 140, received from user 100, and copies of usage tokens issued from NSP 120.

Content provider database 730 may include data associated with content providers, such as CP 140. For example, content provider database 730 may include a CP ID, type of content and/or service provided by a CP, information related to credit that a CP may issue, such as amount and type of credit as it relates to a usage restriction, and expiration information. The content providers contained in content provider database 730 may each be a trusted third party of NSP 120. Content and service data may include a repository accessible by a subscriber, such as user 100. For example, content and service data may include news information, an e-mail service, etc.

Although FIG. 7 illustrates exemplary data contained in master database 630, in other implementations, master database 630 may include fewer, additional and/or different data than the data depicted and described in reference to FIG. 7.

Figure 8:
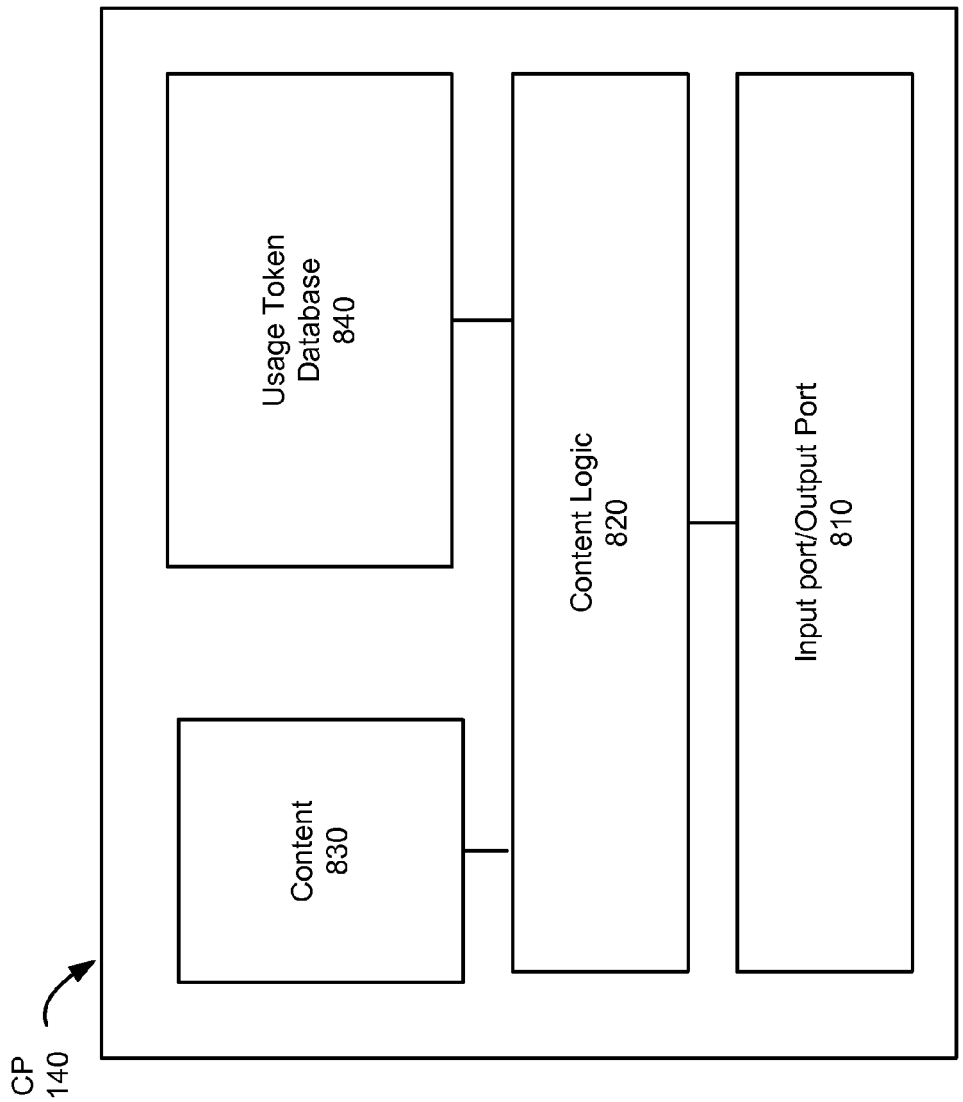
FIG. 8 is a diagram illustrating exemplary internal components of CP 140.

FIG. 8 is a diagram illustrating exemplary internal components of CP 140. The internal components may include an input port/output port 810, a content logic 820, a content 830, and a usage token database 840.

Input port/output port 810 may include any mechanism for receiving incoming data and transmitting outgoing data. Content logic 820 may include logic capable of controlling the operation of CP 140, including, among other things, controlling the access of content 830 by a user, such as user 100. Content logic 820 may include logic capable of generating a usage token having a usage credit based on user 100's access of content 830. Content logic 820 may also generate a usage token based on the data contained in usage token database 840.

Content 830 may include a resource, such as content or a service that may be accessed by and/or provided to a user, such as user 100. For example, content 830 may include VOD movie content that is downloadable. Usage token database 840 may include information associated with the generation of a usage token, as will be described in greater detail in reference to FIG. 9.

Although FIG. 8 illustrates exemplary internal components of CP 140, in other implementations, CP 140 may include fewer, additional and/or different components than the components depicted in FIG. 8.

Figure 9:
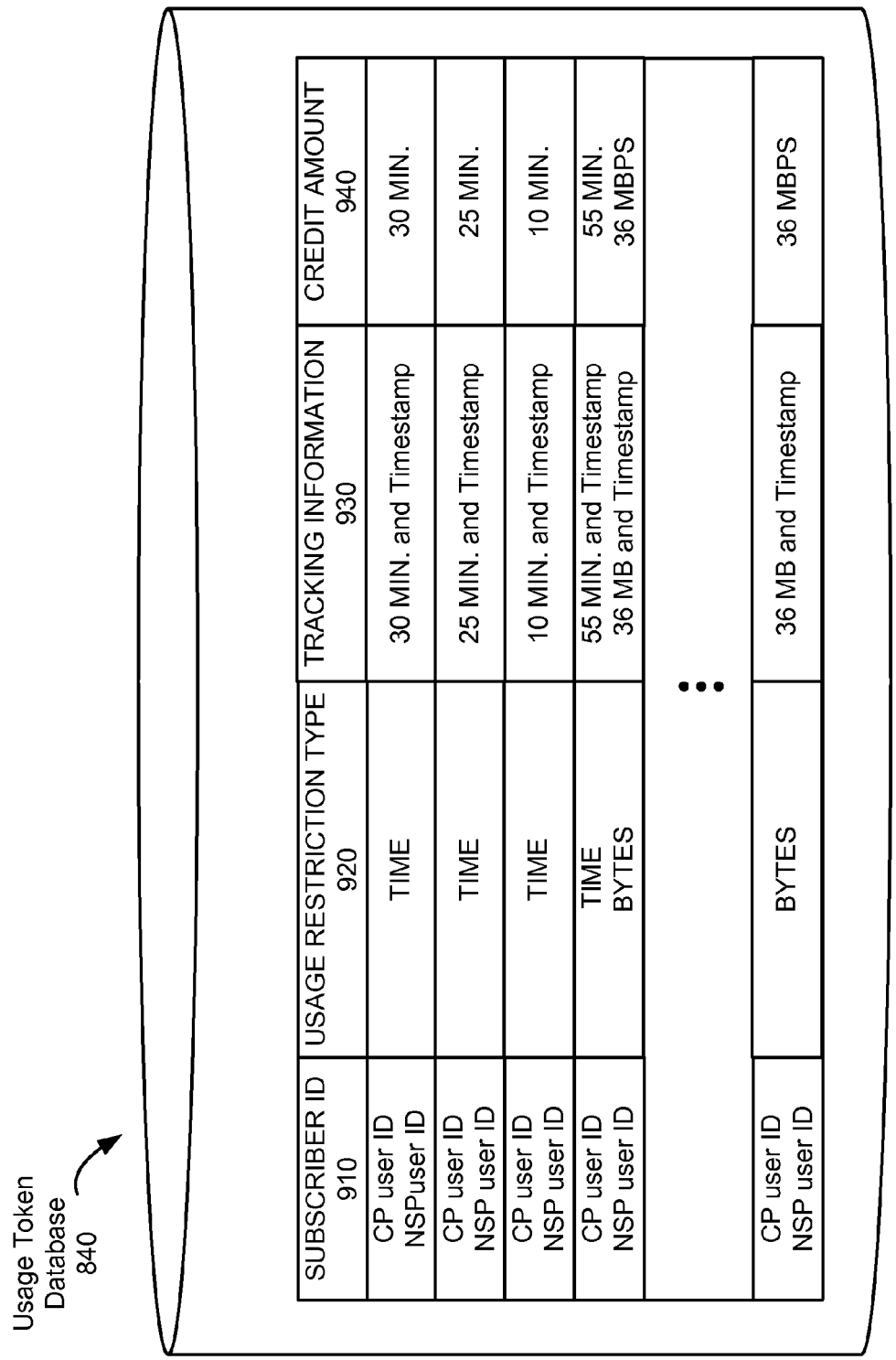
FIG. 9 is a diagram illustrating exemplary data that may be stored in usage token database 840.

FIG. 9 is a diagram illustrating exemplary data that may be stored in usage token database 840. The data contained in usage token database 840 may be arranged in a data structure, such as a table. As illustrated, the table may include the following fields, such as a subscriber ID field 910, a usage restriction type field 920, a tracking information field 930, and a credit amount field 940.

Subscriber ID field 910 may contain, for example, two strings, such as a CP users ID and a users NSP ID. CP user ID may represent an ID of a user, such as user 100, which CP 140 may use in identifying the user before providing content and/or access. NSP users ID may represent an ID of a user that NSP 120 may use when providing network access. In some embodiments, CP users ID and NSP users ID may be identical. Usage restriction type field 920 may contain a string that represents the type of restriction associated with a subscriber's network access, as described above in reference to FIG. 5. Tracking information field 930 may contain a string that indicates monitoring information of a user's access to CP 140, as well as timestamp information. For example, if user 100 accesses content 830 for thirty minutes (30 minutes) on Jun. 1, 2007 from 5:00 p.m to 5:30 p.m., this information may be stored in tracking information field 930. Credit amount field 940 may contain a string that represents the amount of credit that CP 140 may issue in a usage token. For example, if user 100 accesses content 830 for thirty minutes (30 minutes), CP 140 may issue a credit amount of thirty minutes or some other credit amount in a usage token. A usage token will be described below in reference to FIG. 10.

Although FIG. 9 illustrates exemplary data contained in usage token database 840, in other implementations, usage token database 840 may include fewer, additional and/or different data than the data depicted in FIG. 9. For example, in another embodiment, usage token database 840 may not contain usage restriction type field 920 and/or tracking information field 930. As will be described in greater detail below, CP 140 may issue usage credit without employing usage restriction information and/or tracking information.

Figure 10:
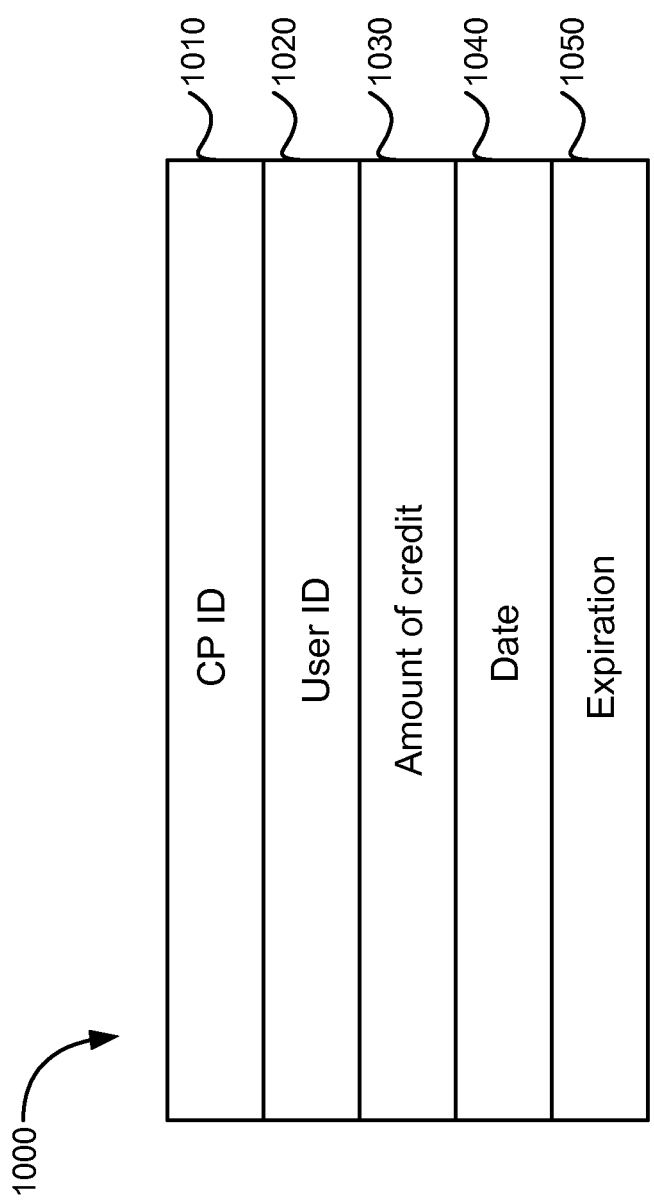
FIG. 10 is a diagram illustrating exemplary information contained in usage token 1000.

FIG. 10 is a diagram illustrating exemplary information contained in usage token 1000. Usage token 1000 may be a message in the form of, for example, a packet. As illustrated in FIG. 10, usage token 1000 may include exemplary information such as a CP ID 1010, a user ID 1020, an amount of credit 1030, a date 1040, and a expiration 1050.

CP ID 1010 may include a string that identifies a CP, such as CP 140. For example, the string may include a network address or a name of a CP. User ID 1020 may include a string that identifies a user, such as user 100. For example, user ID 1020 may include a user account number associated with NSP 120. Amount of credit 1030 may include a string that represents a usage credit. For example, if the usage restriction is a time restriction, amount of credit 1030 may be a time period (e.g., 30 minutes) that represents a period of time that the user identified in user ID 1020 accessed content and/or a service provided by the CP identified in CP ID 1010. Date 1040 may include a string that represents a timestamp (e.g., month, day, year, hour, minute, and second) of when the user identified in user ID 1020 accessed content and/or a service provided by the CP identified in CP ID 1010. Expiration 1050 may include a string that represents an expiration for the usage credit contained in amount of credit 1030. For example, expiration 1050 may be a date (e.g., month, day, and year).

Although FIG. 10 illustrates exemplary information contained in usage token 1000, in other implementations, user token 1000 may include fewer, additional and/or different information than the information depicted in FIG. 10. For example, usage token 1000 may not include expiration 1050.

Figure 11:
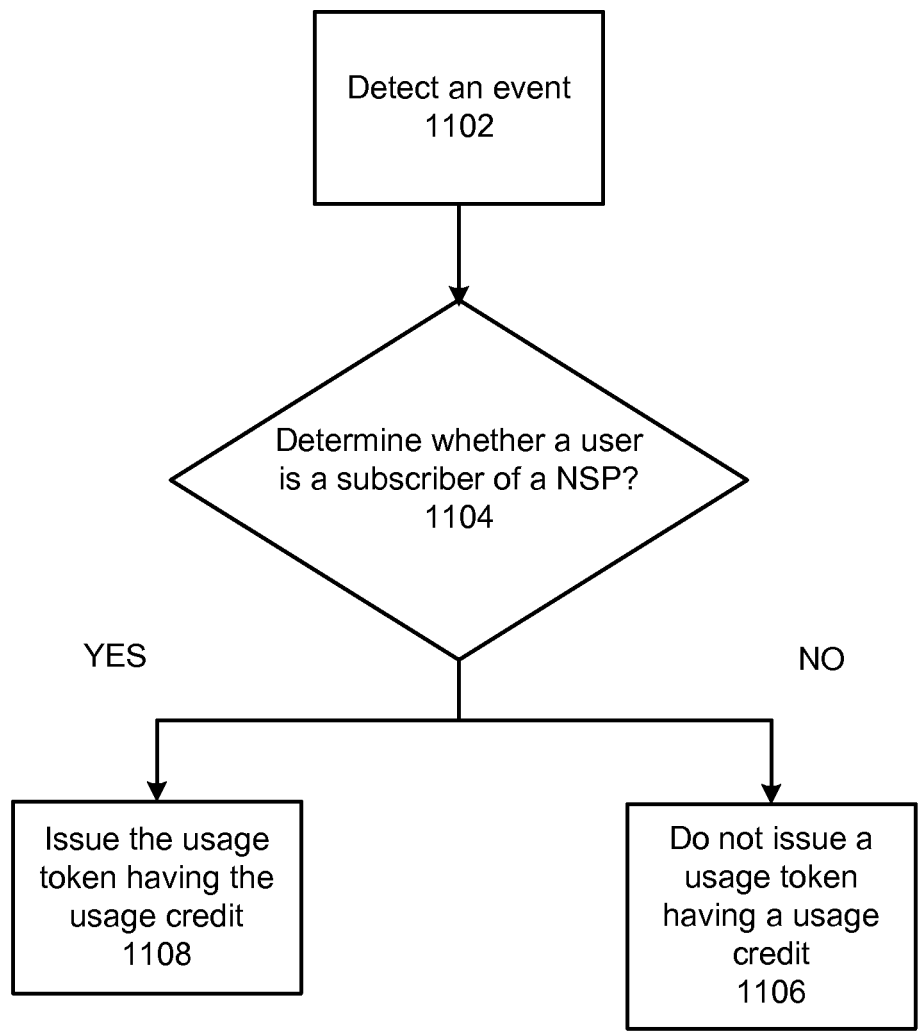
FIG. 11 is a flow chart of an exemplary process of issuing a usage credit.

FIG. 11 is a flow chart of an exemplary process of issuing a usage credit. In one embodiment, the process of FIG. 11 may be performed by a CP, such as CP 140. In another embodiment, one or more acts described below may be performed by one or more other components, including or excluding CP 140. In such instances, when CP 140 is a trusted third party of a NSP, such as NSP 120, CP 140 may perform the exemplary process of FIG. 11. In other instances, when CP 140 is not a trusted third party of NSP 120, CP 140 would not perform the exemplary process of FIG. 11.

Processing may begin with CP 140 detecting an event (Block 1102). For example, CP 140 may detect when user 100 logs into CP 140's site, when user 100 completes a download, or when user 100 purchases an item. In such instance, in one implementation, processing may continue in which CP 140 determines whether user 100 is a subscriber of NSP 120 (Block 1104). For example, when user 100 attempts to access content and/or a service provided by CP 140, CP 140 may require a login. In this way, CP 140 may be able to identify user 100 as a subscriber of NSP 120 by referring, for example, to usage token database 840. In such implementation, content logic 820 may compare the login information acquired from user 100 with subscriber ID field 910 of usage token database 840 to determine whether the login information matches an entry in subscriber ID field 910. In such an instance, CP 140 may determine that user 100 is a subscriber of NSP 120 when the login matches an entry.

If CP 140 determines that user 100 is not a subscriber of NSP 120 (Block 1104-NO), CP 140 may determine that no usage credit is to be issued to user 100 (Block 1106). If, on the other hand, CP 140 determines that user 100 is a subscriber of NSP 120 (Block 1104-YES), CP 140 may issue usage token 1000 that contains a usage credit (Block 1108).

As previously described above, an exemplary usage token, such as usage token 1000, may include CP ID 1010, user ID 1020, amount of credit 1030, date 1040, and expiration 1050. When issuing usage token 1000, CP 140 may include CP ID 1010, and obtain user ID 1020 from subscriber ID field 910 of usage token database 840, such as NSP user ID.

The manner in which CP 140 determines amount of credit 1030 for usage token 1000 may vary. For example, in one implementation, CP 140 may maintain usage restriction type 920 as it relates to each NSP 120 subscriber. In this way, CP 140 may monitor a usage that corresponds to the restriction that NSP 120 imposes on user 100. For example, if usage restriction type 920 is a time restriction, CP 140 may monitor the entire time user 100 accesses content and/or a service provided by CP 140 to obtain tracking information field 930. CP 140 may determine credit amount 940 based on tracking information field 930.

In another implementation, CP 140 may issue a certain amount of credit (e.g., a fixed credit amount), for example, each time user 100 accesses content and/or a service provided by CP 140, without CP 140 monitoring the usage by user 100. In other instances, CP 140 may issue a certain amount of credit based on one or more factors, such a duration of access, content accessed, etc.

In one implementation, CP 140 may determine date 1040 based on tracking information field 930. In another implementation, CP 140 may determine date 1040 based on a login time of user 100 or other information acquired during user 100's access to content and/or a service provided by CP 140. CP 140 may determine expiration 1050 based on information provided by NSP 120. For example, NSP 120 may indicate that a usage credit issued from CP 140 be valid for a certain period of time (e.g., a specific number of days or weeks) before expiring. In another implementation, CP 140 may determine expiration 1050 based on any number of factors, such as the content accessed.

In one embodiment, CP 140 may issue usage token 1000 to user 100. In another embodiment, CP 140 may issue usage token 1000 to NSP 120. In yet another embodiment, CP 140 may issue usage token 1000 to both NSP 120 and user 100. In still another embodiment, CP 140 may issue usage token 1000 to a third party associated with NSP 120 that may verify the authenticity of usage token 1000, or process usage token 1000 in relation to the usage restriction imposed by NSP 120, or for some other purpose.

Figure 12:
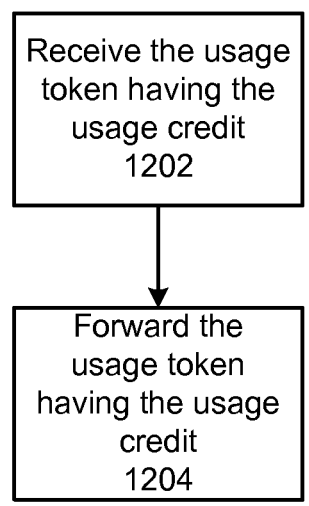
FIG. 12 is a flow chart of an exemplary process for using a usage token.

FIG. 12 is a flow chart of an exemplary process for using a usage token. The process of FIG. 12 may be performed by user 100/user device 105. In other embodiments, on or more of the acts described below may be performed by one or more other devices including or excluding user 100/user device 105.

Processing may begin with a user, such as user 100, receiving a usage token, such as usage token 1000, from a CP, such as CP 140 (Block 1202). In one embodiment, user 100 may receive usage token 1000 after user 100 completes his/her access to the content and/or the service provided by CP 140. In another embodiment, user 100 may receive usage token 1000 anytime during his/her access to the content and/or the service provided by CP 140. When user 100 receives usage token 1000, in one implementation, user 100 may be able to view the content of usage token 1000, such as amount of credit 1030. Alternatively, or additionally, user 100 may be able to save a copy of usage token 1000 for his/her records. In another implementation, user 100 may not be able to view the content of usage token 1000 and/or save a copy of usage token 1000. For example, usage token 1000 may be encrypted or some other security measures may be employed, as will be described in greater detail below.

User device 105 may forward usage token 1000 to NSP 120 (Block 1204). In one embodiment, user device 105 may forward usage token 1000 in response to an action by user 100. In another embodiment, user device 105 may be configured to automatically forward received usage tokens 1000 to NSP 120.

Figure 13:
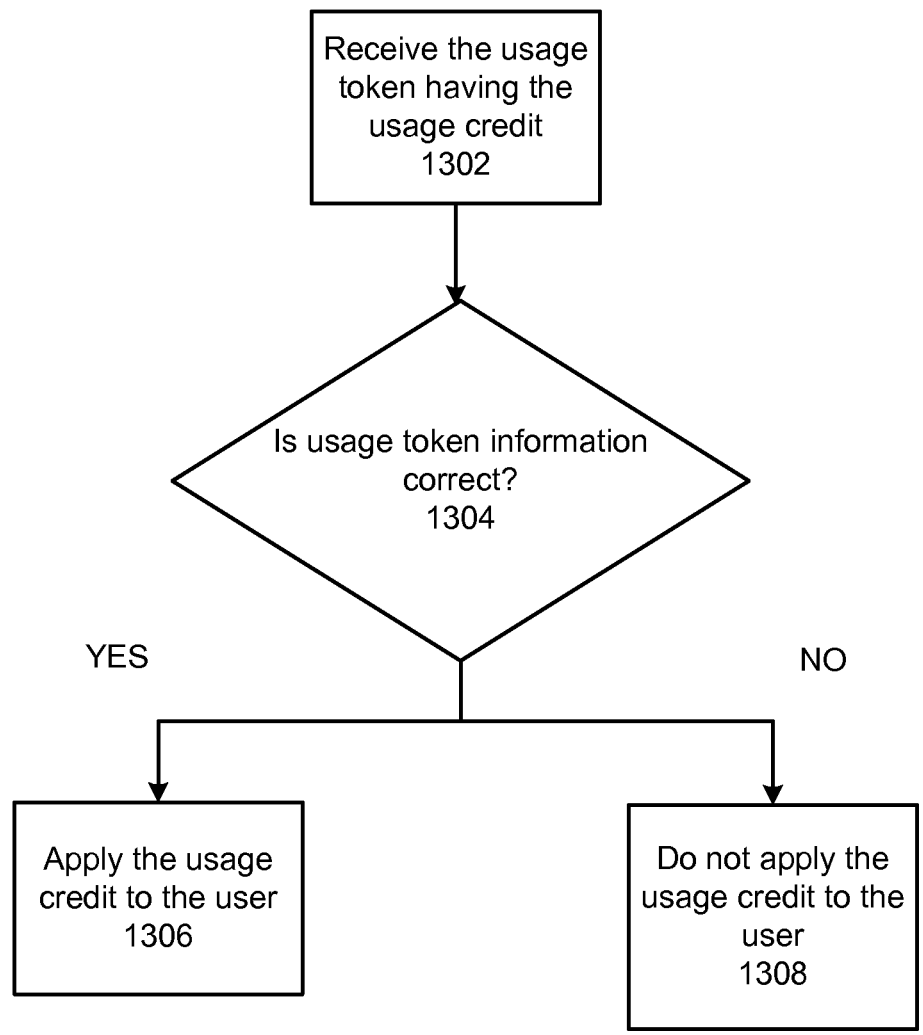
FIG. 13 is a flow chart of a first exemplary process for applying the usage credit.

FIG. 13 is a flow chart of a first exemplary process for applying the usage credit. The process of FIG. 13 may be performed by NSP 120. In other embodiments, one or more acts described below may be performed by one or more other devices including or excluding NSP 120.

Processing may begin with an NSP, such as NSP 120, receiving a usage token, such as usage token 1000, from a user, such as user 100 (Block 1302). When the NSP 120 receives usage token, NSP 120 may determine whether the usage token information is correct (Block 1304).

For example, NSP 120 may confirm CP ID 1010 and user ID 1020 contained in usage token 1000. In one implementation, network management logic 620 may compare CP ID 1010 and user ID 1020 contained in the received usage token 1000 to the corresponding fields in usage restriction database 720 and content provider database 730, respectively, to determine whether CP ID 1010 and user ID 1020 are valid identifiers. Additionally, or alternatively, NSP 120 may confirm date 1040 based on tracking information contained in usage restriction database 720. Additionally, or alternatively, NSP 120 may confirm amount of credit 1030 and/or expiration 1050 based on content provider database 730 or other information relating to the arrangement between NSP 120 and CP 140 for issuing usage credit. Additionally, or alternatively, as will be described below, NSP 120 may employ security measures to ensure the correctness and accuracy of the information contained in usage token 1000.

If NSP 120 determines that the information contained in usage token 1000 is correct (Block 1304-YES), NSP 120 may apply the usage credit of usage token 1000 toward a usage restriction associated with user 100 (Block 1306). In one embodiment, network management logic 620 may update (e.g., apply a usage credit) to master database 600 and restriction database 440. For example, network management logic 620 may subtract amount of credit 1030 contained in usage token 1000 from a value in current usage 530 of restriction database 440 and usage restriction database 720 of master database 600 as it relates to the user identified in user ID 1020.

If NSP 120 determines that the information contained in usage token 1000 is not correct (Block 1304-NO), NSP 120 may not apply the usage credit toward a usage restriction associated with user 100 (Block 1308). For example, NSP 120 may discard usage token 1000. Alternatively or additionally, NSP 120 may notify user 100 that usage token 1000 has not been accepted.

Figure 14:
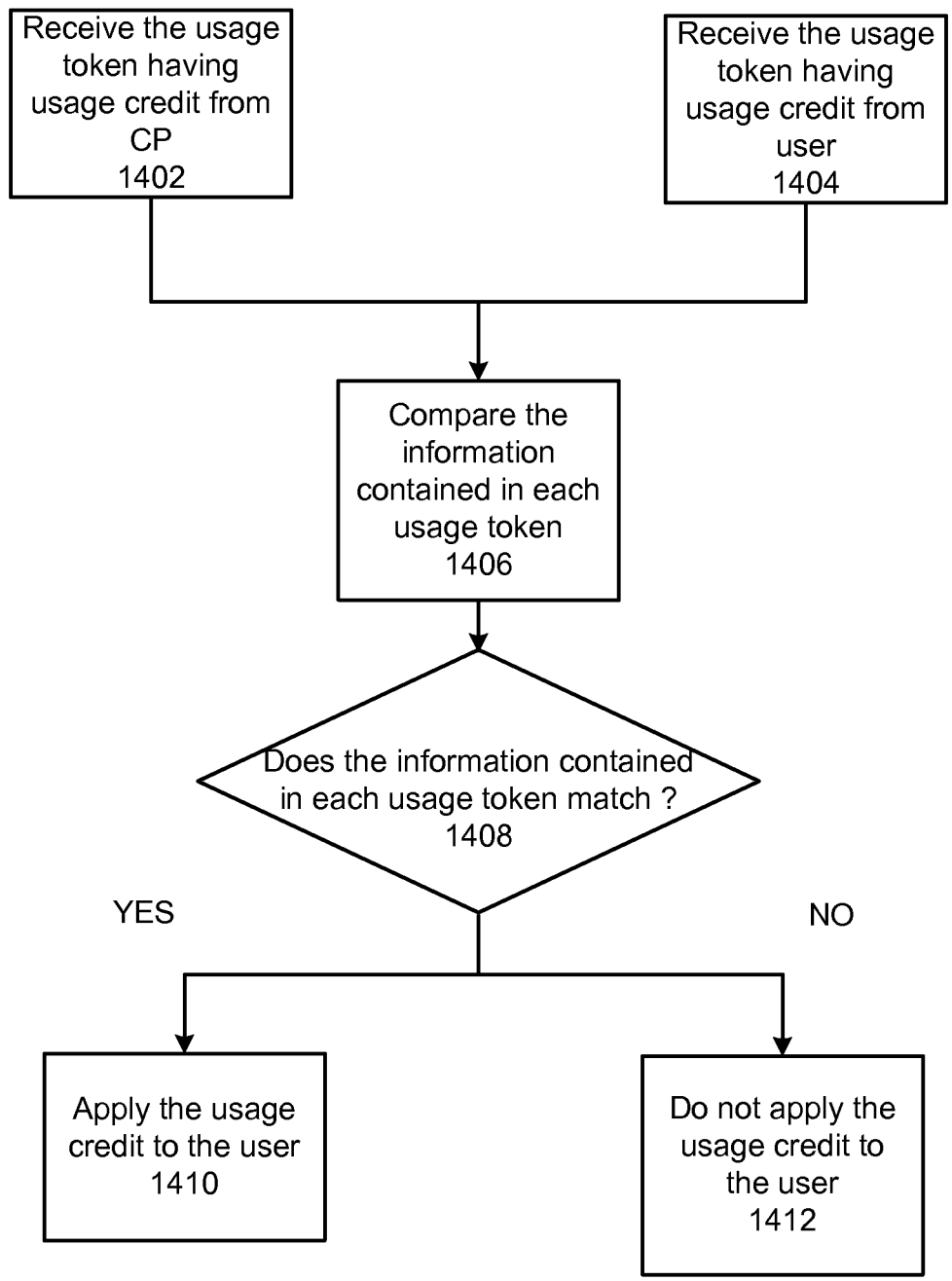
FIG. 14 is a flow chart of a second exemplary process for applying the usage credit.

FIG. 14 is a flow chart of a second exemplary process for applying the usage credit. The process of FIG. 14 may be performed by NSP 120. In other embodiments, one or more of the acts described below may be performed by one or more other devices including or excluding NSP 120.

Processing may begin with NSP 120 receiving a first usage token 1000 from CP 140 (Block 1402), and receiving a second usage token 1000 from user 100 (Block 1404). As previously mentioned, usage tokens may be stored in usage restriction database 720. In one implementation, network management logic 620 may sort incoming usage tokens based on CP ID 1010, user ID 1020 and date 1040 information contained in each usage token 1000. Based on this information, network management logic 620 may identify the first usage token 1000 from CP 140 and the second usage token 1000 from user 1000 in usage restriction database 720 as usage tokens that may be compared. Thus, when NSP 120 receives each usage token 1000, NSP 120 may compare the information contained in each usage token 1000 (Block 1406). For example, network management logic 620 may compare each field of usage token 1000 with the corresponding field of the other usage token 1000.

In one embodiment, if the information contained in the second usage token 1000 received from user 100 matches the information contained in usage token 1000 received from CP 140 (Block 1408-YES), NSP 120 may determine to apply the usage credit of usage token 1000 received from CP 140 (Block 1410). In one embodiment, network management logic 620 may update (e.g., apply a usage credit) to master database 600 and restriction database 440. For example, network management logic 620 may subtract amount of credit 1030 contained in usage token 1000 from current usage 530 of restriction database 440 and master database 600 as it relates to the user identified in user ID 1020.

If, on the other hand, the information contained in the second usage token 1000 received from user 100 is different from the information contained in the first usage token 1000 received from CP 140 (Block 1408-NO), NSP 120 may determine not to apply the usage credit of either usage token 1000 (Block 1412). For example, in this situation, NSP 120 may discard usage token 1000. Alternatively or additionally, NSP 120 may notify user 100 and/or CP 140 that the first and/or the second usage tokens 1000 have been rejected.

As with any form of electronic communication, issues of fraud may arise. Accordingly, security measures may be implemented with respect to the exemplary processes described above in reference to FIG. 11 through FIG. 14. For example, fraud may occur when user 100 tampers with usage token 1000, such as changing amount of credit 1030 of usage token 1000, attempting to use usage token 1000 more than once, attempting to create a usage token 1000 when user 100 never accessed CP 140, or denying receipt of usage token 1000 so that CP 140 will issue user 100 another usage token 1000. In other instances, for example, a malicious party (e.g., not including user 100 or CP 140) may attempt to commit fraud by creating fraudulent usage tokens 1000.

Various methods may be employed to maintain security and prevent fraud. For example, an authentication procedure (e.g., peer entity authentication or data-origin authentication) may be implemented to assure that the communicating entity is the entity that it claims to be. For example, when CP 140 issues usage token 1000 to NSP 120, peer entity authentication may be employed to provide CP 140 and NSP 120 confidence in the identity of the other. Additionally, or alternatively, a data integrity procedure may be employed to assure that usage token 1000 contains, for example, no modifications, insertions, and/or deletions. For example, when NSP 120 issues usage token 1000 to user 100, a message authentication code may added to usage token 1000 so when user 100 forwards usage token 1000 back to NSP 120, NSP 120 may determine the data integrity of usage token 1000. Additionally, or alternatively, a non-repudiation procedure may be employed to protect against denial by one of the parties involved in the communication of having participated in the communication. For example, when CP 140 issues usage token 1000 to NSP 120, a non-repudiation (origin) procedure may be employed to provide proof that usage token 1000 was sent by CP 140.

In one implementation, for example, CP 140 may issue the same usage token 1000 to NSP 120 and user 100, as described above. CP 140 may include a hash code in usage token 1000 issued to NSP 120. When NSP 120 receives usage token 1000 from user 100 and usage token 1000 from CP 140, NSP 120 may confirm the authenticity of usage token 1000 from user 100 by comparing user's 100 usage token 1000 to usage token 1000 from CP 140. In addition, NSP 120 may compare a hash code of user's 100 usage token 1000 to the hash code in usage token from CP 140. When user's 100 usage token 1000 fails the comparison, NSP 120 may reject user's 100 usage token 1000, and not apply any usage credit.

NSP 120 may also implement other security measures, such as providing a secure authenticated channel for transmission of usage token 1000, so as to prevent, for example, spoofing.

It is to be understood, with reference to FIG. 11 through FIG. 14, in the absence of usage token 1000 being issued by CP 140, NSP 120 may apply a usage restriction associated with user 100. Further, it is to be understood that NSP 120 may provide content and/or a service, in addition to network access. Accordingly, although not illustrated, NSP 120 may issue usage token 1000 to user 100 when user 100 accesses such content and/or service provided by NSP 120. User 100 may forward usage token 1000 back to NSP 120, and NSP 120 may apply the usage credit. In another implementation, NSP 120 may issue usage token 1000 to user 100 and NSP 120 may apply the usage credit, without user 100 forwarding usage token 1000 back to NSP 120.

Figure 15:
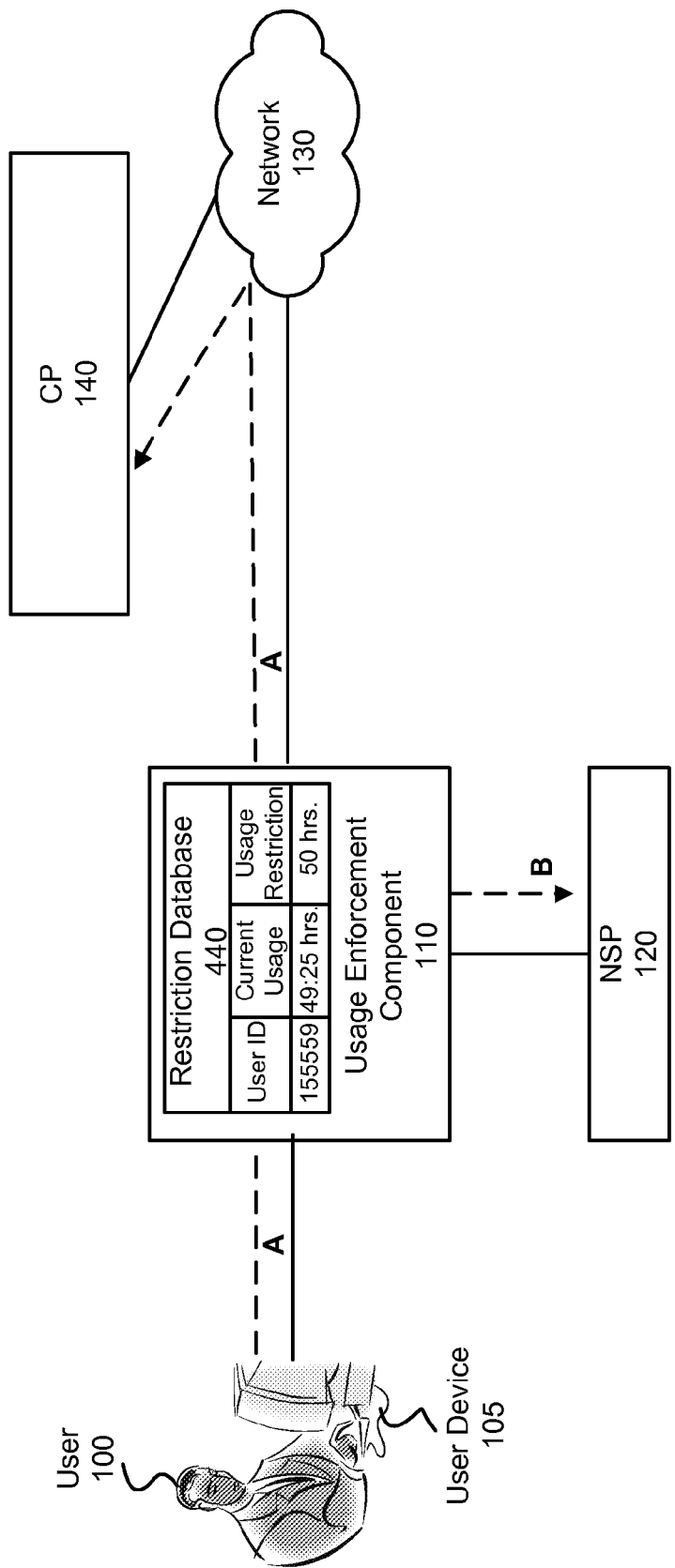
FIG. 15-FIG. 17 are diagrams illustrating first exemplary communications among the exemplary components of FIG. 1.
Figure 16:
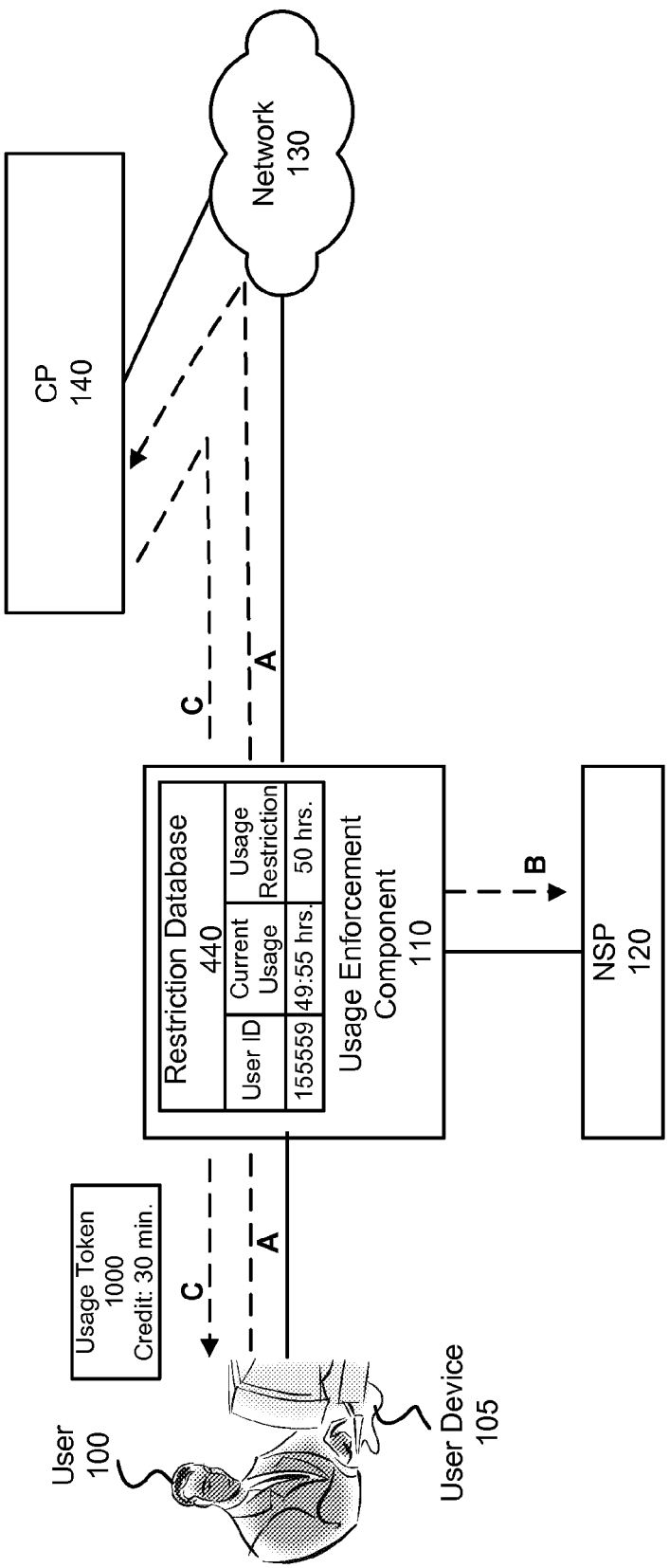
Figure 17:
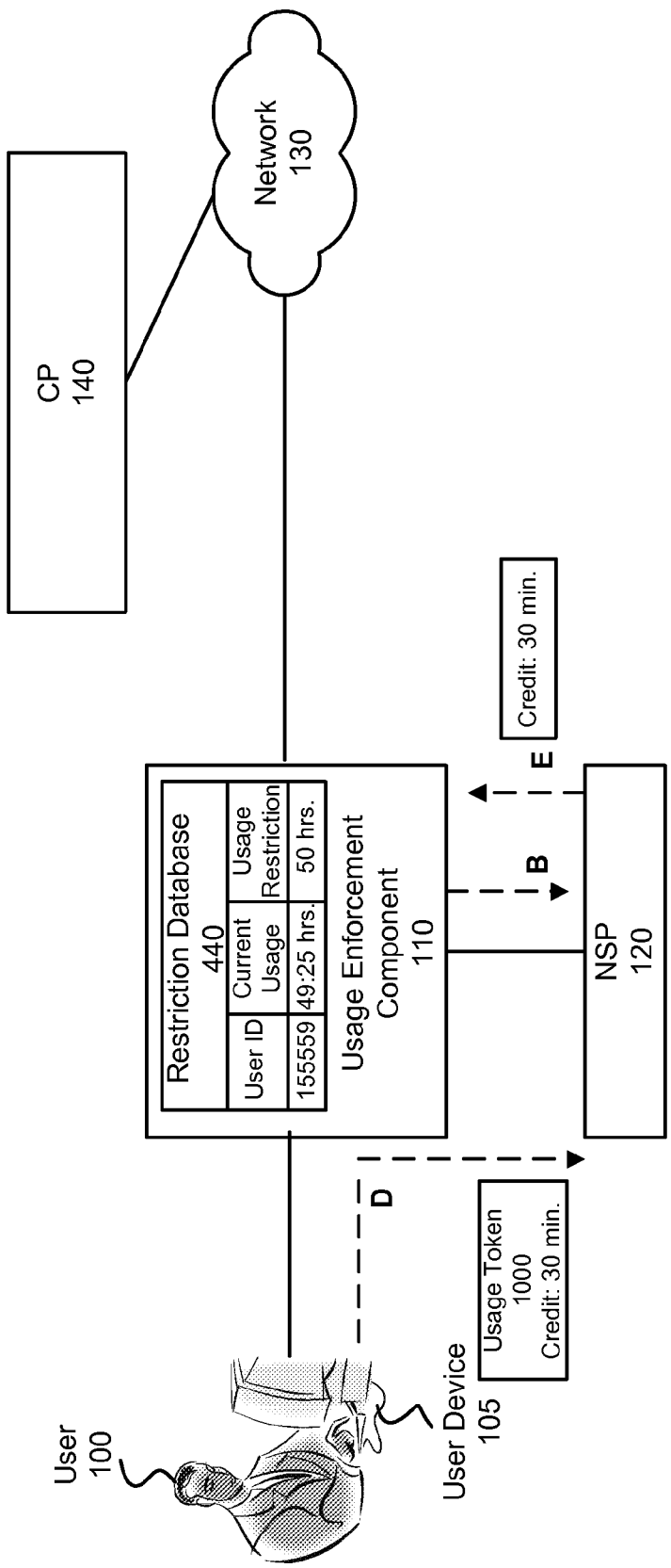

FIG. 15-FIG. 17 are diagrams illustrating first exemplary communications among the exemplary components of FIG. 1. In this example, CP 140 is assumed to be a trusted third party of NSP 120 and has agreed to provide usage credits to subscribers of NSP 120 who obtain content from CP 140. Additionally, in this example, the usage restriction associated with the network access by user 100 may be a time restriction.

As illustrated in FIG. 15, user 100 may establish communication (A) with CP 140 via usage enforcement component 110 and network 130. Upon user 100 establishing communication (A) with CP 140, current usage 530 of restriction database 440 may indicate that user 100 has a current usage of 49:25 hours (i.e., 49 hours, 25 minutes). NSP 120 may be tracking the usage pertaining to user 100 at usage enforcement component 110 in communication (B).

As illustrated in FIG. 16, user 100 may be accessing content from CP 140, such as researching and downloading periodicals. Assume that user 100 accesses the content of CP 140 for 30 minutes. CP 140 may provide the access/downloading of periodicals to user 100, and may issue usage token 1000 to user 100 in communication (C). Usage token 1000 includes, among other things, a credit of 30 minutes. At this moment, current usage 530 of restriction database 440 may indicate that user 100 has a current usage of 49:55 hours (i.e., 49 hours, 55 minutes), since user 100 accessed CP 140 for 30 minutes.

As illustrated in FIG. 17, user 100 may forward usage token 1000 to NSP 120 in communication (D). NSP 120 may determine that the information in usage token 1000 is correct, and may apply the usage credit of usage token 1000 (i.e., 30 minutes) towards current usage 530 associated with user 100 in communication (E). Current usage 530 of restriction database 440 now reads 49:25 hours (i.e., 49 hours, 25 minutes), which is the same value as in FIG. 15.

Figure 18:
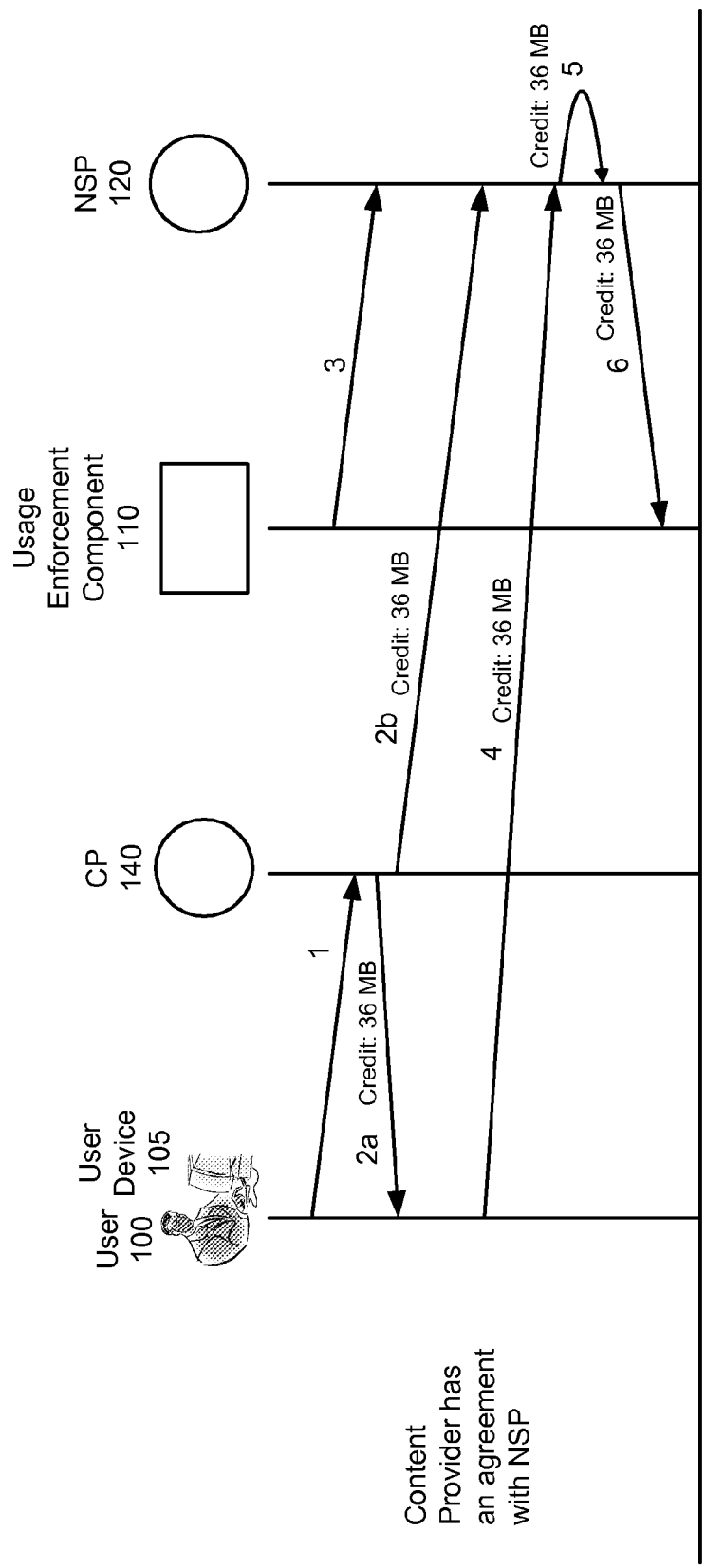
FIG. 18 is a diagram illustrating second exemplary communications among the exemplary components of FIG. 1.

FIG. 18 is a diagram illustrating second exemplary communications among the exemplary components of FIG. 1. Network 130 has been omitted in the diagram. In this example, the usage restriction relates to number of byte restrictions (e.g., amount of downloads per week). FIG. 18 references each communication with a number.

User 100 may request a service from CP 140, such as downloading a movie, as illustrated by communication (1). CP 140 may provide the content to user 100 together with usage token 1000 in communication (2a). Usage token 1000 may include a fixed usage credit of 36 Megabytes (MB). That is, the usage credit of 36 MB may be more or less than the file size of the movie downloaded by user 100. Additionally, CP 140 may provide usage token 1000 to NSP 120 in communication (2b). NSP 120 may be monitoring the network usage of user 100 via usage enforcement component 110 in communication (3). User 100 may send usage token 1000 to NSP 120 in communication (4). NSP 120 may compare usage token 1000 sent by CP 140 to usage token 100 sent by user device 105. In this example, NSP 120 may determine that usage tokens 1000 match. NSP 120 may credit the usage credit to the account of user 100 in communication (5) (e.g., to master database 630) and communication (6) (e.g., to restriction database 440).

The foregoing description of implementations provides illustration, but is not intended to be exhaustive or to limit the implementations to the precise form disclosed. It is to be appreciated that the foregoing description may provide a simple solution that would allow for tracking of a user's network usage and providing for an exemption to a usage restriction without the need to track a content provider's or a service provider's network address. Modifications and variations are possible in light of the above teachings or may be acquired from practice of the teachings. For example, the usage tokens may be issued by other components and/or entities than those discussed herein. For example, a content provider may utilize a trusted party's services to issue usage tokens.

For example, while series of blocks and/or acts have been described with regard to processes illustrated in FIG. 11 through FIG. 14, the order of the blocks and/or acts may be modified in other implementations. Further, non-dependent blocks and/or acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
   detecting, by a network resource provider, an event associated with a particular network resource of the network resource provider;
   identifying, by the network resource provider, a user of a user device as being associated with the event;
   determining, by the network resource provider, whether the user is associated with a particular network service provider;
   identifying, by the network resource provider and when the user is associated with the particular network service provider, a usage restriction to which the user is subject under an agreement with the particular network service provider;
   providing, by the network resource provider and via a network, the particular network resource to the user device,
      the particular network resource being provided when the user is associated with the particular service provider and when the user is not associated with the particular service provider;
   monitoring, by the network resource provider, the providing of the particular network resource to the user device, to generate tracking information; and
   issuing, by the network resource provider and via the network, a first usage token to the user device and a second usage token to the particular service provider,
      the first usage token and the second usage token including a usage credit that corresponds to the providing of the particular network resource when the user is associated with the particular service provider,
      an amount of the first usage token and an amount of the second usage token corresponding to an exemption to the identified usage restriction based on the tracking information,
      the first usage token and the second usage token being issued to cause the identified usage restriction to be enforced based on the usage credit and an amount of usage associated with the user device accessing the particular network resource.

2. The method of claim 1, where providing the network resource includes:
providing, when the user is associated with the particular service provider, an amount of usage of the particular network resource,
where the amount of usage does not exceed the identified usage restriction.

3. The method of claim 1, further comprising:
providing the particular network resource and issuing the usage token in a same communication when the user is associated with the particular service provider.

4. The method of claim 1, where issuing the first usage token and the second usage token comprises:
determining an amount of the usage credit based on an amount of bandwidth, indicated in the tracking information, of the particular network resource that is provided via the network by the particular network service provider.

5. The method of claim 1, where issuing the first usage token and the second usage token comprises:
monitoring an amount of time of access of the particular network resource relative to the usage restriction; and
determining the amount of the usage credit based on monitoring the amount of time.

6. The method of claim 1, where at least one of the first usage token or the second usage token includes an identifier of a content provider, an identifier of the user, the usage credit, a date associated with the providing of the particular network resource, or an expiration of the usage credit.

7. The method of claim 1, where issuing the first usage token and the second usage token comprises:
determining an identifier associated with the user based on log-in information associated with the event.

8. The method of claim 1, where issuing the first usage token and the second usage token comprises:
issuing the first usage token to the user device, and
issuing the second usage token to the particular network service provider,
where the first usage token is not requested by the user.

9. The method of claim 1, where issuing the first usage token and the second usage token comprises:
employing at least one of authentication procedures, data-integrity procedures, or non-repudiation procedures with respect to issuing at least one of the first usage token or the second usage token.

10. A method, comprising:
monitoring, by a network device, an access of a network resource by a user device,
the network resource being provided to the user device by a network resource provider;
determining, by the network device and based on monitoring the access of the network resource, a first amount of usage associated with the access of the network resource by the user device;
applying, by the network device, the first amount of usage to a total amount of usage of the network resource by the user device,
the total amount of usage being associated with a network usage restriction associated with the access of the network resource by the user device;
determining, by the network device, whether a usage token has been issued by the network resource provider, the usage token comprising a usage credit that corresponds to the access of the network resource by the user device;
applying, by the network device, the usage credit to the total amount of usage to obtain an adjusted total amount of usage when the usage token has been issued by the network resource provider,
the usage credit not being applied to the total amount of usage when the usage token has not been issued by the network resource provider;
enforcing, by the network device, the usage restriction based on the total amount of usage when the usage token has not been issued by the network resource provider; and
enforcing, by the network device, the usage restriction based on the adjusted total amount of usage when the usage token has been issued by the network resource provider.

11. The method of claim 10, further comprising:
identifying, when the usage token has been issued by the network resource provider, the user and the network resource provider based on information contained in the usage token.

12. The method of claim 10, further comprising:
confirming, when the usage token has been issued by the network resource provider, that the usage token is valid prior to applying the usage credit; and
reducing the total usage of the network resource based on confirming that the usage token is valid.

13. The method of claim 10, further comprising:
determining, when the usage token has been issued by the network resource provider and prior to applying the usage credit, that the usage token is invalid; and
discarding the usage token, and not applying the usage credit, when the usage token is invalid.

14. A method, comprising:
determining, by a network usage enforcement device, a current amount of usage associated with accessing a network resource by a user device,
the network resource being provided by a network resource provider;
receiving, at the network usage enforcement device and from the network resource provider, a first usage token including a first usage credit that corresponds to accessing the network resource by the user device,
the first usage token comprising an exemption to a usage restriction, with respect to a select usage parameter, of a plurality usage parameters, to which a user of the user device is subject under an agreement with a network service provider, and
the first usage token indicating a credit amount in units of the select usage parameter corresponding to a monitored usage parameter associated with provision of the network resource;
receiving, at the network usage enforcement device and from the user, a second usage token including a second usage credit that corresponds to the accessing the network resource by the user device,
the second usage token comprising the exemption to the usage restriction, with respect to the select usage parameter, and
the second usage token indicating the credit amount in units of the select usage parameter;
comparing, by the network usage enforcement device, information contained in fields of the first usage token to information contained in corresponding fields of the second usage token;

determining, by the network usage enforcement device and based on a result of the comparing, whether the information contained in the fields of the first usage token matches the information contained in the corresponding fields of the second usage token;

applying, by the network usage enforcement device, the credit amount, in units of the select usage parameter, to the current amount of usage to obtain an adjusted amount of usage when the information contained in the fields of the first usage token matches the information contained in the corresponding fields of the second usage token;

enforcing, by the network usage enforcement device, the usage restriction based on the current amount of usage when the information contained in the fields of the first usage token does not match the information contained in the corresponding fields of the second usage token; and enforcing, by the network usage enforcement device, the usage restriction based on the adjusted amount of usage when the information contained in the fields of the first usage token matches the information contained in the corresponding fields of the second usage token.

15. The method of claim 14, further comprising:

rejecting the first usage token and the second usage token when the information contained in the fields the first usage token does not match the information contained in the corresponding fields of the second usage token.

16. The method of claim 14, where the first usage token includes a first expiration of the first usage credit and the second usage token includes a second expiration of the second usage credit, the method further comprising:
  determining whether the first usage credit or the second usage credit has expired; and
  discarding the first usage token and the second usage token when the first usage credit or the second usage credit has expired.

17. A network device, comprising:

one or more processors to:
  determine a current amount of usage associated with accessing a network resource by a user device,
    the network resource being provided by a network resource provider,
  determine whether a usage token has been issued by the network service provider,
    the usage token being associated with accessing the network resource by the user device,
    the usage token comprising an exemption to a network access usage restriction, with respect to a select usage parameter, of a plurality usage parameters, to which a user of the user device is subject by a network service provider, and
    the usage token including:
      an amount of a usage credit in units of the select usage parameter that corresponds to a monitored usage parameter associated with the network resource,
  apply, when the usage token has been issued by the network service provider, the amount of usage credit identified in the usage token to the current amount of usage to obtain an adjusted amount of usage,
  enforce the access usage restriction based on the current amount of usage when the usage token has not been issued by the network resource provider, and
  enforce the access usage restriction based on the adjusted amount of usage when the usage token has been issued by the network resource provider.

18. The network device of claim 17, where the one or more processors are further to:

determine whether the information contained in the usage token is not valid, and enforce the access usage restriction based on the current amount of usage when the usage token has been issued by the network resource provider and the information contained in the usage token is not valid.

19. The network device of claim 17, where the one or more processors are further to:

sort the usage token received, from a plurality of usage tokens, based on the identifier of the user and date information.

20. The network device of claim 17, where the one or more processors are further to:

receive the usage token from the user.

* * * * *